US006440548B1

(12) United States Patent
Bourdelais et al.

(10) Patent No.: US 6,440,548 B1
(45) Date of Patent: Aug. 27, 2002

(54) PHOTOGRAPHIC BASE WITH ORIENTED POLYEFIN AND OPACIFYING LAYER

(75) Inventors: Robert P. Bourdelais, Pittsford; Peter T. Aylward, Hilton; Alphonse D. Camp, Rochester, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/470,264

(22) Filed: Dec. 22, 1999

(51) Int. Cl.[7] ......................... B32B 27/08; B32B 27/18; B32B 27/20; B32B 27/32; B32B 27/36

(52) U.S. Cl. ............................... 428/304.4; 428/314.4; 428/315.5; 428/317.9; 428/458; 428/480; 428/483; 428/910; 430/523; 430/524; 430/531; 430/533; 430/534

(58) Field of Search ................................ 428/480, 483, 428/910, 304.4, 314.4, 315.5, 315.9, 317.9, 318.4, 458; 430/271.1, 275.1, 276.1, 523, 524, 531, 533, 534

(56) References Cited

U.S. PATENT DOCUMENTS

| | | | | | |
|---|---|---|---|---|---|
| 3,944,699 | A | * | 3/1976 | Mathews et al. | 428/220 |
| 4,086,383 | A | | 4/1978 | Yamano et al. | |
| 4,187,113 | A | * | 2/1980 | Mathews et al. | 430/533 |
| 5,026,622 | A | | 6/1991 | Yamada et al. | |
| 5,286,614 | A | * | 2/1994 | Ishizaki et al. | 430/501 |
| 5,387,501 | A | | 2/1995 | Yajima et al. | |
| 5,422,175 | A | * | 6/1995 | Ito et al. | 428/304.4 |
| 5,516,563 | A | | 5/1996 | Schumann et al. | |
| 5,866,282 | A | | 2/1999 | Bourdelais et al. | |
| 6,020,116 | A | | 2/2000 | Camp et al. | |
| 6,030,742 | A | | 2/2000 | Bourdelais et al. | |
| 6,030,759 | A | | 2/2000 | Gula et al. | |
| 6,043,009 | A | | 3/2000 | Bourdelais et al. | |

FOREIGN PATENT DOCUMENTS

| | | | |
|---|---|---|---|
| JP | 06-214343 | * | 8/1994 |

* cited by examiner

*Primary Examiner*—Vivian Chen
(74) *Attorney, Agent, or Firm*—Paul A. Leipold

(57) ABSTRACT

A photographic element comprising a laminated base wherein said base comprises a voided polymer sheet having laminated thereto a biaxially oriented polyolefin sheet on the bottom of said polyester sheet and a biaxially oriented polyolefin sheet laminated to the top of said polyester sheet, wherein said photographic element has a bottom voided opacifying layer below at least one voided layer of said voided polymer sheet and a topside voided opacifying layer above said at least one voided layer of said voided polyester sheet.

11 Claims, No Drawings

PHOTOGRAPHIC BASE WITH ORIENTED POLYEFIN AND OPACIFYING LAYER

FIELD OF THE INVENTION

This invention relates to imaging materials. In a preferred form, it relates to base materials for photographic reflective paper.

BACKGROUND OF THE INVENTION

In the formation of color paper it is known that the base paper has applied thereto a layer of polymer, typically polyethylene. This layer serves to provide waterproofing to the paper, as well as providing a smooth surface on which the photosensitive layers are formed. The formation of a suitably smooth surface is difficult, requiring great care and expense to ensure proper laydown and cooling of the polyethylene layers. Such a smooth surface requires a great deal of care and expense associated with chill rolls. There is a need for a photographic color print material that has a polyethylene surface but does not require chill rolls for the formation of a glossy surface.

In photographic papers the polyethylene layer also serves as a carrier layer for titanium dioxide and other whitener materials as well as tint materials. It would be desirable if the colorant materials rather than being dispersed throughout the polyethylene layer could be concentrated nearer the surface of the layer where they would be more effective photographically.

In photographic paper the polyethylene layer provides a means of containing $TiO_2$. The $TiO_2$ provides a highly reflective layer directly under the light sensitive layers to provide image sharpness and opacity. Prior art photographic reflective paper use white pigments, typically $TiO_2$ and blue colorants to provide a white support and improve image sharpness during exposure by preventing the exposure light from reaching the paper fibers where the light is scattered and reflected back to the imaging layers. It has been found that while the $TiO_2$ does improve image sharpness and does provide a white support and opacity, $TiO_2$ below the imaging layers corrupts the dye hue angle of photographic dyes, changing the dye hue angle away from the perceptually preferred hue angle of the dyes. It would be desirable if a support material has the image sharpness, opacity and whiteness of prior art color papers without the use of white pigments in the support. It would be desirable if $TiO_2$ did not have to be directly under the light sensitive layer or even be present in a photographic element. There remains a need to provide added opacity and whiteness without the use of expensive white pigments.

Prior art photographic support materials typically utilize melt extruded polyethylene to waterproof the paper during the wet processing of images during the image development process. The gelatin based light sensitive silver halide emulsion generally adheres well to the polyethylene layer during manufacturing and wet processing of images. It would be desirable if a biaxially oriented sheet contained an integral bonding layer to provide emulsion adhesion during emulsion coating and the wet processing of images during the image development step.

Present photographic papers generally being constructed of polyethylene coated cellulose paper, can be easily damaged, torn or abraded as images are viewed by consumers over the lifetime of an image. It would be desirable if a photographic support were more tear resistant, offering the consumer an image that is tougher than current photographic images. Furthermore, the use of paper in a photographic print which is used to provide opacity to prevent see through when looking at a print, can further result in a non-uniform surface which can lower its glossy appearance. There is a need for smoother photographic print material that provides opacity while not interfering with the gloss of the print. Typically when a polyester sheet is used for a base in photographic imaging, the base is clear and the resulting print material has poor opacity unless a pigmented filled polyester base is use. Such as base is very expensive and creates other problems. There remains a need to provide photographic base materials that improved opacity.

PROBLEM TO BE SOLVED BY THE INVENTION

There remains a need for a more effective imaging base to provide improved opacity over conventional bases.

SUMMARY OF THE INVENTION

It is an object of the invention to provide improved photographic papers.

It is another object to provide a more opaque photographic element.

It is another object to provide a photographic element that does not allow the transmission of light It is an additional object to provide a photographic element that will hide dark or colored base layers.

These and other objects of the invention are accomplished by a photographic element comprising a laminated base wherein said comprises a voided polymer sheet having laminated thereto a biaxially oriented polyolefin sheet on the bottom of said polyester sheet and a biaxially oriented polyolefin sheet laminated to the top of said polymer sheet.

ADVANTAGEOUS EFFECT OF THE INVENTION

The invention provides an improved photographic support. It particularly provides an improved photographic papers that are more opaque and provides the use of color layers or indicia without show through.

DETAILED DESCRIPTION OF THE INVENTION

The invention has numerous advantages over prior practices in the art. The invention provides a photographic element that has much less tendency to curl when exposed to extremes of humidity. Further, the invention provides a photographic element that is much lower in cost as the criticalities of the formation of the polyethylene are removed. There is no need for the difficult and expensive casting and cooling in forming a surface on the polyethylene layer as the biaxially oriented polymer sheet of the invention provides a high quality surface for casting of photosensitive layers. The optical properties of the photographic elements in accordance with the invention are improved as the color materials may be concentrated at the surface of the biaxially oriented sheet for most effective use with little waste of the colorant materials. Photographic materials utilizing microvoided sheets and voided polyester base of the invention have improved resistance to tearing. The photographic materials of the invention are lower in cost to produce as the microvoided sheet may be scanned for quality prior to assembly into the photographic member. With present polyethylene layers the quality of the layer cannot be assessed until after complete formation of the base paper with the polyethylene waterproofing layer attached. Therefore, any defects result in expensive discard of expensive product. In addition the microvoided sheets provide opacity without the use of expensive pigments such as $TiO_2$. In addition to obtaining opacity without pigmentation, there is a secondary benefit because microvoids do not add unwanted color to the image. The invention allows faster hardening of photographic paper emulsion, as water vapor is not transmitted from the emulsion through the biaxially oriented sheets.

The photographic elements of this invention are more scratch resistant as the oriented polymer sheet on the back of the photographic element resists scratching and other damage more readily than polyethylene. The photographic elements of this invention are balanced for stiffness in the machine and cross directions. A balanced stiffness of the photographic element is perceptually preferred over a photographic element that is predominantly stiff in one direction. The photographic elements of this invention utilize a low cost method for printing multiple color branding information of the back side of the image increasing the content of the information on the back side of the image. The voided polyester base used in the invention is smoother than prior art cellulose paper and substantially free of undesirable orange peel which interferes with the viewing of the image.

The photographic elements of this invention utilize an integral emulsion bonding layer that allows the emulsion to adhere to the support materials during manufacturing and wet processing of images. The microvoided sheets of the invention are laminated to the polyester base utilizing a bonding layer that prevents delamination of the biaxially oriented sheets from the base paper. These and other advantages will be apparent from the detailed description below.

The terms as used herein, "top", "upper", "emulsion side", and "face" mean the side or toward the side of a photographic member bearing the imaging layers. The terms "bottom", "lower side", and "back" mean the side or toward the side of the photographic member opposite from the side bearing the photosensitive imaging layers or developed image. The term as used herein, "transparent" means the ability to pass radiation without significant deviation or absorption. For this invention, "transparent" material is defined as a material that has a spectral transmission greater than 90%. For a photographic element, spectral transmission is the ratio of the transmitted power to the incident power and is expressed as a percentage a s follows $T_{RGB}=10^{-D}*100$ where D is the average of the red, green and blue Status A transmission density response measured by an X-Rite model 310 (or comparable) photographic transmission densitometer.

The layers of the biaxially oriented polyolefin sheet of this invention have levels of voiding, optical brightener and colorants adjusted to provide optimum optical properties for image sharpness, lightness and opacity. An important aspect of this invention is the voided polymer layer under the silver halide image layer. The microvoided polymer layers in the oriented polyolefin sheet and the voided polyester base provides acceptable opacity, sharpness and lightness without the use of expensive white pigments. Because the use of white pigments is avoided, the dye hue of color dye couplers coated on the support of this invention is significantly improved yielding an image with snappy color. The preferred percent transmission for the reflective support material with an opacifying layer of this invention is less than 10%. For a reflective support material, transmission of a significant amount of light is undesirable as light illuminates the logo printing on the back of the image, reducing the quality of the image during viewing. A percent transmission greater than 10% allows enough light to be transmitted during image viewing to reduce the quality of the image.

The backside of the photographic element is laminated with a biaxially oriented sheet to reduce humidity image curl. There are particular problems with prior art color papers when they are subjected to extended high humidity storage such as at greater than 50% relative humidity. The high strength biaxially oriented sheet on the back side resists the curling forces, producing a much flatter image. The biaxially oriented sheet on the back has roughness at two frequencies to allow for efficient conveyance through photographic processing equipment and improved consumer writability as consumers add personal information to the back side of photographic paper with pens and pencils. The biaxially oriented sheet also has an energy to break of $4.0\times10^7$ joules per cubic meter to allow for efficient chopping and punching of the photographic element during photographic processing of images.

Any suitable biaxially oriented polyolefin sheet may be used for the sheet on the top side of the laminated base of the invention. Microvoided composite biaxially oriented sheets are preferred and are conveniently manufactured by coextrusion of the core and surface layers, followed by biaxial orientation, whereby voids are formed around void-initiating material contained in the core layer. Such composite sheets are disclosed in U.S. Pat. Nos. 4,377,616; 4,758,462; and 4,632,869.

The core of the preferred composite top sheet should be from 15 to 95% of the total thickness of the sheet, preferably from 30 to 85% of the total thickness. The nonvoided skin(s) should thus be from 5 to 85% of the sheet, preferably from 15 to 70% of the thickness.

The density (specific gravity) of the composite top sheet, expressed in terms of "percent of solid density" is calculated as follows:

$$\frac{\text{Composite Sheet Density}}{\text{Polymer Density}}\times 100 = \%\text{ of Solid Density}$$

Percent solid density should be between 45% and 100%, preferably between 67% and 100%. As the percent solid density becomes less than 67%, the composite sheet becomes less manufacturable due to a drop in tensile strength and it becomes more susceptible to physical damage.

The total thickness of the composite top sheet can range from 12 to 100 micrometers, preferably from 20 to 70 micrometers. Below 20 micrometers, the microvoided sheets may not be thick enough to minimize any inherent non-planarity in the support and would be more difficult to manufacture. At thickness higher than 70 micrometers, little improvement in either surface smoothness or mechanical properties are seen, and so there is little justification for the further increase in cost for extra materials.

In said photographic or imaging element, the water vapor barrier can be achieved by integrally forming said vapor barrier by coextrusion of the polymer(s) into at least one or more layers and then orienting the sheet by stretching it in the machine direction and then the cross direction. The process of stretching creates a sheet that is more crystalline and has better packing or alignment of the crystalline areas. Higher levels of crystallinity results in lower water vapor transmissions rates which in turn results in faster emulsion hardening. The oriented sheet is then laminated to a paper base.

"Void" is used herein to mean devoid of added solid and liquid matter, although it is likely the "voids" contain gas. The void-initiating particles which remain in the finished packaging sheet core should be from 0.1 to 10 micrometers in diameter, preferably round in shape, to produce voids of the desired shape and size. The size of the void is also dependent on the degree of orientation in the machine and transverse directions. Ideally, the void would assume a shape which is defined by two opposed and edge contacting concave disks. In other words, the voids tend to have a lens-like or biconvex shape. The voids are oriented so that the two major dimensions are aligned with the machine and transverse directions of the sheet. The Z-direction axis is a minor dimension and is roughly the size of the cross diameter of the voiding particle. The voids generally tend to be closed cells, and thus there is virtually no path open from one side of the voided-core to the other side through which gas or liquid can traverse.

The void-initiating material may be selected from a variety of materials, and should be present in an amount of about 5 to 50% by weight based on the weight of the core matrix polymer. Preferably, the void-initiating material comprises a polymeric material. When a polymeric material is used, it may be a polymer that can be melt-mixed with the polymer from which the core matrix is made and be able to form dispersed spherical particles as the suspension is cooled down. Examples of this would include nylon dispersed in polypropylene, polybutylene terephthalate in polypropylene, or polypropylene dispersed in polyethylene terephthalate. If the polymer is preshaped and blended into the matrix polymer, the important characteristic is the size and shape of the particles. Spheres are preferred and they can be hollow or solid. These spheres may be made from cross-linked polymers which are members selected from the group consisting of an alkenyl aromatic compound having the general formula $Ar—C(R)=CH_2$, wherein Ar represents an aromatic hydrocarbon radical, or an aromatic halohydrocarbon radical of the benzene series and R is hydrogen or the methyl radical; acrylate-type monomers include monomers of the formula $CH_2=C(R')—C(O)(OR)$ wherein R is selected from the group consisting of hydrogen and an alkyl radical containing from about 1 to 12 carbon atoms and R' is selected from the group consisting of hydrogen and methyl; copolymers of vinyl chloride and vinylidene chloride, acrylonitrile and vinyl chloride, vinyl bromide, vinyl esters having formula $CH_2=CH(O)COR$, wherein R is an alkyl radical containing from 2 to 18 carbon atoms; acrylic acid, methacrylic acid, itaconic acid, citraconic acid, maleic acid, fumaric acid, oleic acid, vinylbenzoic acid; the synthetic polyester resins which are prepared by reacting terephthalic acid and dialkyl terephthalics or ester-forming derivatives thereof, with a glycol of the series $HO(CH_2)_nOH$ wherein n is a whole number within the range of 2–10 and having reactive olefinic linkages within the polymer molecule, the above described polyesters which include copolymerized therein up to 20 percent by weight of a second acid or ester thereof having reactive olefinic unsaturation and mixtures thereof, and a cross-linking agent selected from the group consisting of divinylbenzene, diethylene glycol dimethacrylate, diallyl fumarate, diallyl phthalate and mixtures thereof.

Examples of typical monomers for making the crosslinked polymer include styrene, butyl acrylate, acrylamide, acrylonitrile, methyl methacrylate, ethylene glycol dimethacrylate, vinyl pyridine, vinyl acetate, methyl acrylate, vinylbenzyl chloride, vinylidene chloride, acrylic acid, divinylbenzene, acrylamidomethyl-propane sulfonic acid, vinyl toluene, etc. Preferably, the cross-linked polymer is polystyrene or poly(methyl methacrylate). Most preferably, it is polystyrene and the cross-linking agent is divinylbenzene.

Processes well known in the art yield non-uniformly sized particles, characterized by broad particle size distributions. The resulting beads can be classified by screening the beads spanning the range of the original distribution of sizes. Other processes such as suspension polymerization, limited coalescence, directly yield very uniformly sized particles.

The void-initiating materials may be coated with agents to facilitate voiding. Suitable agents or lubricants include colloidal silica, colloidal alumina, and metal oxides such as tin oxide and aluminum oxide. The preferred agents are colloidal silica and alumina, most preferably, silica. The cross-linked polymer having a coating of an agent may be prepared by procedures well known in the art. For example, conventional suspension polymerization processes wherein the agent is added to the suspension is preferred. As the agent, colloidal silica is preferred.

The void-initiating particles can also be inorganic spheres, including solid or hollow glass spheres, metal or ceramic beads or inorganic particles such as clay, talc, barium sulfate, calcium carbonate. The important thing is that the material does not chemically react with the core matrix polymer to cause one or more of the following problems: (a) alteration of the crystallization kinetics of the matrix polymer, making it difficult to orient, (b) destruction of the core matrix polymer, (c) destruction of the void-initiating particles, (d) adhesion of the void-initiating particles to the matrix polymer, or (e) generation of undesirable reaction products, such as toxic or high color moieties. The void-initiating material should not be photographically active or degrade the performance of the photographic element in which the biaxially oriented polyolefin sheet is utilized.

For the biaxially oriented sheet on the top side toward the emulsion, suitable classes of thermoplastic polymers for the biaxially oriented sheet and the core matrix-polymer of the preferred composite sheet comprise polyolefins.

Suitable polyolefins include polypropylene, polyethylene, polymethylpentene, polystyrene, polybutylene and mixtures thereof. Polyolefin copolymers, including copolymers of propylene and ethylene such as hexene, butene, and octene are also useful. Polypropylene is preferred, as it is low in cost and has desirable strength properties.

The nonvoided skin layers of the composite top sheet can be made of the same polymeric materials as listed above for the core matrix. The composite sheet can be made with skin(s) of the same polymeric material as the core matrix, or it can be made with skin(s) of different polymeric composition than the core matrix. For compatibility, an auxiliary layer can be used to promote adhesion of the skin layer to the core.

The total thickness of the topmost skin layer of the top sheet should be between 0.20 micrometers and 1.5 micrometers, preferably between 0.5 and 1.0 micrometers. Below 0.5 micrometers any inherent non-planarity in the coextruded skin layer may result in unacceptable color variation. At skin thickness greater than 1.0 micrometers, there is a reduction in the photographic optical properties such as image resolution. At thickness greater that 1.0 micrometers there is also a greater material volume to filter for contamination such as clumps or poor color pigment dispersion.

Addenda may be added to the topmost skin layer of the top sheet to change the color of the imaging element. For photographic use, a white base with a slight bluish tinge is preferred. The addition of the slight bluish tinge may be accomplished by any process which is known in the art including the machine blending of color concentrate prior to extrusion and the melt extrusion of blue colorants that have been pre blended at the desired blend ratio. Colored pigments that can resist extrusion temperatures greater than 320° C. are preferred as temperatures greater than 320° C. are necessary for coextrusion of the skin layer. Blue colorants used in this invention may be any colorant that does not have an adverse impact on the imaging element. Preferred blue colorants include Phthalocyanine blue pigments, Cromophtal blue pigments, Irgazin blue pigments and Irgalite organic blue pigments. Optical brightener may also be added to the skin layer to absorb UV energy and emit light largely in the blue region. $TiO_2$ may also be added to the skin layer. While the addition of $TiO_2$ in the thin skin layer of this invention does not significantly contribute to the optical performance of the sheet it can cause numerous manufacturing problems such as extrusion die lines and spots and corrupt the hue angle of the photographic dyes. The skin layer substantially free of $TiO_2$ is preferred. $TiO_2$ added to a layer between 0.20 and 1.5 micrometers does not substantially improve the optical properties of the support, will add cost to the design and will cause objectionable pigments lines in the extrusion process.

A photographic element substantially free of white pigments is preferred. It has been found that when photographic dyes are coated on support containing white pigments, the hue angle of the developed image changes compared to the hue angle of the dyes coated onto a transparent support. The hue angle change of photographic dyes caused by the presence of white pigments often reduces the quality level of the dyes compared to the dye set coated on a transparent base that is substantially free of white pigments. The preferred change in dye hue angle of the developed image compared to the hue angle of the dyes coated onto a transparent support is less than 7 degrees. Dye hue angle changes greater than 9 degrees are not significantly different from typical color photographic reflective papers.

The layer adjacent and below the voided layer of the top sheet may also contain white pigments of this invention. A layer that is substantially colorant free is preferred as there is little improvement in the optical performance of the photographic support when colorants are added below the voided layer.

Addenda may be added to the biaxially oriented top sheet of this invention so that when the biaxially oriented sheet is viewed from a surface, the imaging element emits light in the visible spectrum when exposed to ultraviolet radiation. Emission of light in the visible spectrum allows for the support to have a desired background color in the presence of ultraviolet energy. This is particularly useful when images are viewed outside, as sunlight contains ultraviolet energy and may be used to optimize image quality for consumer and commercial applications.

Addenda known in the art to emit visible light in the blue spectrum are preferred. Consumers generally prefer a slight blue tint to white defined as a negative b* compared to a white white defined as a b* within one b* unit of zero. b* is the measure of yellow/blue in CIE space. A positive b* indicates yellow while a negative b* indicates blue. The addition of addenda that emits in the blue spectrum allows for tinting the support without the addition of colorants which would decrease the whiteness of the image. The preferred emission is between 1 and 5 delta b* units. Delta b* is defined as the b* difference measured when a sample is illuminated ultraviolet light source and a light source without any significant ultraviolet energy. Delta b* is the preferred measure to determine the net effect of adding an optical brightener to the top biaxially oriented sheet of this invention. Emissions less than 1 b* unit can not be noticed by most customers therefore is it not cost effective to add optical brightener to the biaxially oriented sheet. An emission greater that 5 b* units would interfere with the color balance of the prints making the whites appear too blue for most consumers.

The preferred addenda of this invention is an optical brightener. An optical brightener is colorless, fluorescent, organic compound that absorbs ultraviolet light and emits it as visible blue light. Examples include but are not limited to derivatives of 4,4'-diaminostilbene-2,2'-disulfonic acid, coumarin derivatives such as 4-methyl-7-diethylaminocoumarin, 1-4-Bis(O-Cyanostyryl) Benzol and 2-Amino-4-Methyl Phenol.

In a preferred embodiment of this invention, the photographic element comprises a laminated base which is preferably a voided polyester which is then laminated with a biaxially oriented polyolefin sheet of the bottom as well as a biaxially oriented sheet of the top side. In this invention the bottom biaxially oriented sheet further comprises an opacifying layer. Polyolefin sheets are preferred because they are low in cost and have good optical properties.

The opacifying layer in one embodiment of this invention is substantily free of $TiO_2$ or other pigments. The primary means of providing the opacity is to void the biaxially oriented polyolefin sheet. Providing opacity without the use of $TiO_2$ provides a unique and unexpected benefit in a photographic element in that the image has substantially pure colors. In addition being able to provide opacity with a minimal amount of $TiO_2$ is very cost effective. Furthermore the addition of $TiO_2$ or other pigments to a polymer has potential for a number of problems. Pigments in polymers need to be stabilized to reduce both thermal and light oxidation which if not corrected will result in the polymer layer cracking or the polymer crosslinking during manufacturing. Stabilizer which are referred to as antioxidants while very useful with pigmented polymer are often not required for non- pigmented polymer systems. All polymers are inherently prone to chemical degradation that leads to loss of mechanical properties. They undergo thermal degradation during processing such as extrusion of thin films and photooxidative degradation with long-term exposure to light. $TiO_2$ catalyzes and accelerates both thermal and photooxidative degradation. In the art of resin coating a single layer or coextrusion of multiple layers of polymers onto photographic paper, the melt polymers are extruded at high temperatures and are subjected to high shear forces. These conditions may degrade the polymer, resulting in discoloration and charring, formation of polymer slugs or "gels", and formation of lines and streaks in the extruded film from degraded material deposits on die surfaces. Also, thermally degraded polymer is less robust than nondegraded polymer for long-term stability, and may thereby shorten the life of the print. Nevertheless, $TiO_2$ does remain a low cost and effective opacifying system and may be used also or in combination with voiding to opacify the elements of the invention.

The optical brightener may be added to any layer in the multilayer coextruded biaxially oriented polyolefin sheet. The preferred location is adjacent to or in the exposed surface layer of said sheet. This allows for the efficient concentration of optical brightener which results in less optical brightener being used when compared to traditional photographic supports. Typically 20% to 40% less optical brightener is required when the optical brightener is concentrated in a functional layer close to the imaging layers.

When the desired weight % loading of the optical brightener begins to approach a concentration at which the optical brightener migrates to the surface of the support forming crystals in the imaging layer, the addition of optical brightener into the layer adjacent to the exposed layer is preferred. In prior art imaging supports that use optical brightener, an expensive grades of optical brightener are used to prevent migration into the imaging layer. When optical brightener migration is a concern, as with light sensitive silver halide imaging systems, the preferred exposed layer comprises polyethylene that is substantially free of optical brightener. In this case, the migration from the layer adjacent to the exposed layer is significantly reduced because the exposed surface layer acts as a barrier for optical brightener migration allowing for much higher optical brightener levels to be used to optimize image quality. Further, locating the optical brightener in the layer adjacent to the exposed layer allows for a less expensive optical brightener to be used as the exposed layer, which is substantially free of optical brightener, prevents significant migration of the optical brightener. Another preferred method to reduce unwanted optical brightener migration in biaxially oriented sheets of this invention is to use polypropylene for the layer adjacent to the exposed surface. Prior art photographic supports generally use melt extruded polyethylene to provide waterproofing to the base paper. Since optical brightener is more soluble in polypropylene than polyethylene, the optical brightener is less likely to migrate from polypropylene to the exposed surface layer.

A biaxially oriented top sheet of this invention which has a microvoided core is preferred. The microvoided core adds opacity and whiteness to the imaging support further improving imaging quality. Combining the image quality advantages of a microvoided core with a material which absorbs ultraviolet energy and emits light in the visible spectrum allows for the unique optimization of image quality as the image support can have a tint when exposed to ultraviolet energy yet retain excellent whiteness when the image is viewed using lighting that does not contain significant amounts of ultraviolet energy such as indoor lighting.

The coextrusion, quenching, orienting, and heat setting of any of the three sheets or composite sheets utilized in the invention may be effected by any process which is known in the art for producing oriented sheet, such as by a flat sheet process or a bubble or tubular process. The flat sheet process involves extruding the blend through a slit die and rapidly quenching the extruded web upon a chilled casting drum so that the core matrix polymer component of the sheet and the skin components(s) are quenched below their glass solidification temperature. The quenched sheet is then biaxially oriented by stretching in mutually perpendicular directions at a temperature above the glass transition temperature, below the melting temperature of the matrix polymers. The sheet may be stretched in one direction and then in a second direction or may be simultaneously stretched in both directions. After the sheet has been stretched, it is heat set by heating to a temperature sufficient to crystallize or anneal the polymers while restraining to some degree the sheet against retraction in both directions of stretching.

The polyolefin sheets, while described as having preferably at least three layers of a microvoided core and a skin layer on each side, may also be provided with additional layers that may serve to change the properties of the biaxially oriented sheet. A different effect may be achieved by additional layers. Such layers might contain tints, antistatic materials, or different void-making materials to produce sheets of unique properties. Biaxially oriented sheets could be formed with surface layers that would provide an improved adhesion, or look to the support and photographic element. The biaxially oriented extrusion could be carried out with as many as 10 layers if desired to achieve some particular desired property.

These polyolefin sheets may be coated or treated after the coextrusion and orienting process or between casting and full orientation with any number of coatings which may be used to improve the properties of the sheets including printability, to provide a vapor barrier, to make them heat sealable, or to improve the adhesion to the support or to the photo sensitive layers. Examples of this would be acrylic coatings for printability, coating polyvinylidene chloride for heat seal properties. Further examples include flame, plasma or corona discharge treatment to improve printability or adhesion.

By having at least one nonvoided skin on the microvoided core, the tensile strength of the sheet is increased and makes it more manufacturable. It allows the sheets to be made at wider widths and higher draw ratios than when sheets are made with all layers voided. Coextruding the layers further simplifies the manufacturing process.

The spectral transmission of the opacifying layer of the invention should have a spectral transmission of less than 10%. Such a spectral transmission is desirable because it provides a element with good light blocking characteristics. This helps to minimize show through when the prints are being viewed and there may be a source of backlighting or in there is an indica present on the back of the photographic element. When more than one opacifying layer is being used, the additive spectral transmission for the photographic element should be less than 10% which may allow the use of an oriented sheets with a spectral transmission of greater than 10%.

In an additional embodiment of this invention, the opacifying layer is an integral bottom layer of said voided polyester sheet. In this embodiment opacity is a result of the voided polyester layer in combination with the lower layer. Since the opacifying layer is an integral layer, there is no added lamination step required and the relative cost should be lower. In a further embodiment the opacifying layer comprises a layer between said voided polyester and said bottom biaxially oriented polyolefin sheet. In this embodiment a layer of melt extrudable polymer or room temperature adhesive that further comprises a pigment is coated or otherwise applied to the voided polyester sheet during the lamination step. The pigment preferably is $TiO_2$ because of it high index of refraction and high opacifying power. Other pigments may be used such as BaSO4, clay talc, $CaCO_3$, kaolin, ZnO or other pigments known in the art. When pigment is added to a melt extrudable polymer, it is often desirable to add antioxidants and slip additives to enhance it performance properties. In addition colorants and optical brighteners may also be added to impart a slight coloration to the photographic element. An additional means of providing an opacifying layer is to coat a layer onto the voided polyester sheet prior to lamination. This means typically applies an aqueous or solvent based polymer with a pigment that is coated onto the polyester sheet and then dried. In the case of a ultraviolet or E-beam material that is applied in a 100% solids form, then the drying step would not be requied. The lamination of the biaxially oriented polymer sheet is applied in a subsquence transformation step. Typically a binder consisting of a latex polymer and a pigment are mixed and then applied to the web by any one of a number of coating techniques.

Said polymers are applied as a coating from a solution in an organic solvent or mixture of solvents. Preferred examples of such polymers include addition-type polymers and interpolymers prepared from ethylenically unsaturated monomers which include acrylates and methacrylates such as methyl acrylate, ethyl acrylate, butyl acrylate, hexyl acrylate, n-octyl acrylate, 2-ethylhexyl acrylate, nonyl acrylate, benzyl acrylate, lauryl acrylate, methyl methacrylate, ethyl methacrylate, butyl methcrylate, hexyl methacrylate, n-octyl methacrylate, 2-ethylhexyl methacrylate, nonyl methacrylate, benzyl methacrylate, lauryl methacrylate, dialkyl itaconates, dialkyl maleates, acrylonitrile and methacrylonitrile, styrenes including substituted styrenes, vinyl acetates, vinyl ethers, vinyl and vinylidene halides, and olefins such as butadiene and isoprene. Other polymers that may be effectively employed for the purpose of the present invention include organic solvent soluble condensation polymers such as cellulose derivatives, including cellulose nitrate, cellulose acetate, cellulose acetate proprionate, cellulose acetate butyrate, and the like, polycarbonates, polyurethanes, polyesters, epoxies, and polyamides.

Preferred examples of particularly suitable aqueous dispersions include water dispersible polyurethanes and polyesters. Examples of suitable latex polymers include addition-type polymers and interpolymers prepared from the above mentioned ethylenically unsaturated monomers. The latex polymers may be prepared by conventional emulsion polymerization methods. The latex polymers may be core-shell polymers as described in U.S. Pat. No. 4,497,917.

The hydrophobic polymers which are applied from organic solvent or aqueous media may contain reactive functional groups capable of forming covalent bonds by intermolecular crosslinking or by reaction with a crosslinking agent (i.e., a hardener). Suitable reactive functional groups include hydroxyl, carboxyl, carbodiimide, amino, amide, allyl, epoxide, aziridine, vinyl sulfone, sulfinic acid, and active methylene.

A preferred embodiment for providing an opacifying layer below a voided polyester sheet is to provide a metallized layer or metal foil layer. Said metallized layer may be vacuum deposited on the on the bottom side of the polyester sheet or may be vacuum deposited on an oriented or voided oriented polymer sheet which is then laminated to the voided polyester sheet. A further means of providing a metal layer is to laminated a sheet of foil to the bottom side of side voided polyester sheet. The metallized layer is preferred because it provides a significant degree of opacity and is an integral part of either the voided polyester or biaxially oriented polyolefin sheet. Typically when a metallized or foil layer are used they will impart a dark appearance to the overall photographic element. Using at least one layer of voids and preferably two or more voided layer by themselves or in combination with a pigment layer will minimize the dark appearance associated with metallized layers.

An opacifying layer to control the opacity can also be achieved by the use of a metal foil layer laminated to a paper base or metallized layer(s) coated or otherwise applied to the biaxially oriented sheet which is then laminated to the base sheet. The sheets of metal foil can be attached to the base with the use of a melt polymer or adhesive coating. In the case in which the metal layer(s) are applied under the photo sensitive or imaging layer(s), a layer or polyethylene was applied to provide for better adhesion of the photo imaging layer to the base. In the case in which the metallized layer is incorporated with the biaxially oriented sheet of polypropylene, the metallized layer is vacuum deposited on the biaxially oriented sheet. A tie layer of melt polymer or coated adhesive is used to attach said sheet to the voided base. The metal or vacuum deposit layer can comprise at least one material from the following list of aluminum, nickel, steel, gold, zinc, copper, titanium, metallic alloys as well as inorganic compounds such as silicon oxides, silicon nitrides, aluminum oxides or titanium oxides. The preferred material comprises a vacuum deposited layer of aluminum and one or more layers of polyolein which have been adhered to a voided sheet of polyester.

Polyester layers are preferred over polyolefin layers because they can be compounded with a higher level of pigments than polyolefins. In order to provide high levels of opacity in this invention, one embodiment comprises a photographic element in which the opacifying layer comprises $TiO_2$ pigment in a polymer layer wherein $TiO_2$ comprises between 30 and 70% by weight of said opacifying layer. Such high levels of $TiO_2$ are desirable for improved sharpness, high levels of opacity and overall whiteness. In addition said opacifying layer may further comprises antioxidants, slip agents, tints and optical brighteners.

In a further embodiment of this invention wherein said opacifying layer below said voided polyester layer may further comprise carbon black. Carbon black is preferred in a photographic element because it has a very strong light absorbing capability. This light absorbing capability is important in providing a high degree of sharpness by minimizing secondary stray reflection exposures of the light sensitive layer. A synergistic benefit is observed when the carbon black layer is used in conjunction with a voided layer and or pigmented and voided layer.

When the product needs to be designed to optimize sharpness and a high level of opacity, it is desirable to provide a photographic element comprising a voided polyester sheet with an opacifying layer on the bottom and the top said sheet. In this embodiment the opacifying layers may be pigmented layers coated or an integral part of the polyester sheet, metallized layers or biaxially oriented sheet laminated to the voided polyester sheet.

In order to provide a high degree of opacity without the use of expensive pigment, it is desirable in another preferred embodiment to provide an imaging element comprising a voided polyester sheet having voided biaxially oriented polyolefin sheet or other suitable polymer sheet to both the top and bottom of said voided polyester sheet. When these voided sheets are laminated with an adhesive tie layer, there are three separate voided layers offset with a binder layer to provide exceptional opacity.

In a most preferred embodiment of this invention said photographic element has a layer of polyethylene directly adjacent and beneath the photosensitive layer. Polyethylene is preferred because it has excellent adhesion to the photographic emulsion. Besides polyethylene surfaces of polyester or polypropylene may be primed and subbed with gelatin to aid in the adhesion of photographic emulsions to the substrate surface. The biaxially oriented top sheets used in the invention contain an integral emulsion bonding layer which avoids the need for expensive priming coatings or energy treatments. The bonding layer used in the invention is a low density polyethylene skin on the biaxially oriented sheet. Gelatin based silver halide emulsion layers of the invention have been shown to adhere well to low density polyethylene when used in combination with corona discharge treatment. The integral bonding skin layer also serves as a carrier for the blue tints that correct for the native yellowness of the gelatin based silver halide image element. Concentrating the blue tints in the thin, skin layer reduces the amount of expensive blue tint materials when compared to prior art photographic papers that contain blue tint materials.

This invention is directed to a silver halide photographic element capable of excellent performance when exposed by either an electronic printing method or a conventional optical printing method. An electronic printing method comprises subjecting a radiation sensitive silver halide emulsion layer of a recording element to actinic radiation of at least $10^{-4}$ ergs/cm$^2$ for up to 100 $\mu$ seconds duration in a pixel-by-pixel mode wherein the silver halide emulsion layer is comprised of silver halide grains as described above. A conventional optical printing method comprises subjecting a radiation sensitive silver halide emulsion layer of a recording element to actinic radiation of at least $10^{-4}$ ergs/cm$^2$ for $10^{-3}$ to 300 seconds in an imagewise mode wherein the silver halide emulsion layer is comprised of silver halide grains as described above.

The laminated base of the invention may be utilized with any conventional photographic photosensitive layers. The invention in a preferred embodiment utilizes a radiation-sensitive emulsion comprised of silver halide grains (a) containing greater than 50 mole percent chloride, based on silver, (b) having greater than 50 percent of their surface area provided by {100} crystal faces, and (c) having a central portion accounting for from 95 to 99 percent of total silver and containing two dopants selected to satisfy each of the following class requirements: (i) a hexacoordination metal complex which satisfies the formula $$[ML_6]^n \qquad (I)$$

wherein n is zero, −1, −2, −3, or −4; M is a filled frontier orbital polyvalent metal ion, other than iridium; and $L_6$ represents bridging ligands which can be independently selected, provided that least four of the ligands are anionic ligands, and at least one of the ligands is a cyano ligand or a ligand more electronegative than a cyano ligand; and (ii) an iridium coordination complex containing a thiazole or substituted thiazole ligand.

This invention is directed towards a photographic recording element comprising a support and at least one light sensitive silver halide emulsion layer comprising silver halide grains as described above.

It has been discovered quite surprisingly that the combination of dopants (i) and (ii) provides greater reduction in reciprocity law failure than can be achieved with either dopant alone. Further, unexpectedly, the combination of dopants (i) and (ii) achieve reductions in reciprocity law failure beyond the simple additive sum achieved when employing either dopant class by itself. It has not been reported or suggested prior to this invention that the combination of dopants (i) and (ii) provides greater reduction in reciprocity law failure, particularly for high intensity and short duration exposures. The combination of dopants (i) and (ii) further unexpectedly achieves high intensity reciprocity with iridium at relatively low levels, and both high and low intensity reciprocity improvements even while using conventional gelatino-peptizer (e.g., other than low methionine gelatino-peptizer).

In a preferred practical application, the advantages of the invention can be transformed into increased throughput of digital substantially artifact-free color print images while exposing each pixel sequentially in synchronism with the digital data from an image processor.

In one embodiment, the present invention represents an improvement on the electronic printing method. Specifically, this invention in one embodiment is directed to an electronic printing method which comprises subjecting a radiation sensitive silver halide emulsion layer of a recording element to actinic radiation of at least $10^{-4}$ ergs/cm$^2$ for up to $100\mu$ seconds duration in a pixel-by-pixel mode. The present invention realizes an improvement in reciprocity failure by selection of the radiation sensitive silver halide emulsion layer. While certain embodiments of the invention are specifically directed towards electronic printing, use of the emulsions and elements of the invention is not limited to such specific embodiment, and it is specifically contemplated that the emulsions and elements of the invention are also well suited for conventional optical printing.

It has been unexpectedly discovered that significantly improved reciprocity performance can be obtained for silver halide grains (a) containing greater than 50 mole percent chloride, based on silver, and (b) having greater than 50 percent of their surface area provided by {100} crystal faces by employing a hexacoordination complex dopant of class (i) in combination with an iridium complex dopant comprising a thiazole or substituted thiazole ligand. The reciprocity improvement is obtained for silver halide grains employing conventional gelatino-peptizer, unlike the contrast improvement described for the combination of dopants set forth in U.S. Pat. Nos. 5,783,373 and 5,783,378, which requires the use of low methionine gelatino-peptizers as discussed therein, and which states it is preferable to limit the concentration of any gelatino-peptizer with a methionine level of greater than 30 micromoles per gram to a concentration of less than 1 percent of the total peptizer employed. Accordingly, in specific embodiments of the invention, it is specifically contemplated to use significant levels (i.e., greater than 1 weight percent of total peptizer) of conventional gelatin (e.g., gelatin having at least 30 micromoles of methionine per gram) as a gelatino-peptizer for the silver halide grains of the emulsions of the invention. In preferred embodiments of the invention, gelatino-peptizer is employed which comprises at least 50 weight percent of gelatin containing at least 30 micromoles of methionine per gram, as it is frequently desirable to limit the level of oxidized low methionine gelatin which may be used for cost and certain performance reasons.

In a specific, preferred form of the invention it is contemplated to employ a class (i) hexacoordination complex dopant satisfying the formula:

$$[ML_6]^n \qquad (I)$$

where n is zero, −1, −2, −3 or −4;

M is a filled frontier orbital polyvalent metal ion, other than iridium, preferably $Fe^{+2}$, $Ru^{+2}$, $Os^{+2}$, $Co^{+3}$, $Rh^{+3}$, $Pd^{+4}$ or $Pt^{+4}$, more preferably an iron, ruthenium or osmium ion, and most preferably a ruthenium ion;

$L_6$ represents six bridging ligands which can be independently selected, provided that least four of the ligands are anionic ligands and at least one (preferably at least 3 and optimally at least 4) of the ligands is a cyano ligand or a ligand more electronegative than a cyano ligand. Any remaining ligands can be selected from among various other bridging ligands, including aquo ligands, halide ligands (specifically, fluoride, chloride, bromide and iodide), cyanate ligands, thiocyanate ligands, selenocyanate ligands, tellurocyanate ligands, and azide ligands. Hexacoordinated transition metal complexes of class (i) which include six cyano ligands are specifically preferred.

Illustrations of specifically contemplated class (i) hexacoordination complexes for inclusion in the high chloride grains are provided by Olm et al U.S. Pat. No. 5,503,970 and Daubendiek et al U.S. Pat. Nos. 5,494,789 and 5,503,971, and Keevert et al U.S. Pat. No. 4,945,035, as well as Murakami et al Japanese Patent Application Hei-2[1990]-249588, and Research Disclosure Item 36736. Useful neutral and anionic organic ligands for class (ii) dopant hexacoordination complexes are disclosed by Olm et al U.S. Pat. No. 5,360,712 and Kuromoto et al U.S. Pat. No. 5,462,849.

Class (i) dopant is preferably introduced into the high chloride grains after at least 50 (most preferably 75 and optimally 80) percent of the silver has been precipitated, but before precipitation of the central portion of the grains has been completed. Preferably class (i) dopant is introduced before 98 (most preferably 95 and optimally 90) percent of the silver has been precipitated. Stated in terms of the fully precipitated grain structure, class (i) dopant is preferably present in an interior shell region that surrounds at least 50 (most preferably 75 and optimally 80) percent of the silver and, with the more centrally located silver, accounts the entire central portion (99 percent of the silver), most preferably accounts for 95 percent, and optimally accounts for 90 percent of the silver halide forming the high chloride grains. The class (i) dopant can be distributed throughout the interior shell region delimited above or can be added as one or more bands within the interior shell region.

Class (i) dopant can be employed in any conventional useful concentration. A preferred concentration range is from $10^{-8}$ to $10^{-3}$ mole per silver mole, most preferably from $10^{-6}$ to $5\times10^{-4}$ mole per silver mole.

The following are specific illustrations of class (i) dopants:

(i-1) $[Fe(CN)_6]^{-4}$
(i-2) $[Ru(CN)_6]^{-4}$
(i-3) $[Os(CN)_6]^{-4}$
(i-4) $[Rh(CN)_6]^{-3}$
(i-5) $[Co(CN)_6]^{-3}$
(i-6) $[Fe(pyrazine)(CN)_5]^{-4}$
(i-7) $[RuCl(CN)_5]^{-4}$
(i-8) $[OsBr(CN)_5]^{-4}$
(i-9) $[RhF(CN)_5]^{-3}$
(i-10) $[In(NCS)_6]^{-3}$
(i-11) $[FeCO(CN)_5]^{-3}$
(i-12) $[RuF_2(CN)_4]^{-4}$
(i-13) $[OsCl_2(CN)_4]^{-4}$
(i-14) $[RhI_2(CN)_4]^{-3}$
(i-15) $[Ga(NCS)_6]^{-3}$
(i-16) $[Ru(CN)_5(OCN)]^{-4}$
(i-17) $[Ru(CN)_5(N_3)]^{-4}$
(i-18) $[Os(CN)_5(SCN)]^{-4}$
(i-19) $[Rh(CN)_5(SeCN)]^{-3}$
(i-20) $[Os(CN)Cl_5]^{-4}$
(i-21) $[Fe(CN)_3Cl_3]^{-3}$
(i-22) $[Ru(CO)_2(CN)_4]^{-1}$ When the class (i) dopants have a net negative charge, it is appreciated that they are associated with a counter ion when added to the reaction vessel during precipitation. The counter ion is of little importance, since it is ionically dissociated from the dopant in solution and is not incorporated within the grain. Common counter ions known to be fully compatible with silver chloride precipitation, such as ammonium and alkali metal ions, are contemplated. It is noted that the same comments apply to class (ii) dopants, otherwise described below.

The class (ii) dopant is an iridium coordination complex containing at least one thiazole or substituted thiazole ligand. Careful scientific investigations have revealed Group VIII hexahalo coordination complexes to create deep electron traps, as illustrated R. S. Eachus, R. E. Graves and M. T. Olm *J Chem. Phys.,* Vol. 69, pp. 4580–7 (1978) and *Physica Status Solidi A*, Vol. 57, 429–37 (1980) and R. S. Eachus and M. T. Olm *Annu. Rep. Prog. Chem. Sect. C. Phys. Chem.,* Vol. 83, 3, pp. 3–48 (1986). The class (ii) dopants employed in the practice of this invention are believed to create such deep electron traps. The thiazole ligands may be substituted with any photographically acceptable substituent which does not prevent incorporation of the dopant into the silver halide grain. Exemplary substituents include lower alkyl (e.g., alkyl groups containing 1–4 carbon atoms), and specifically methyl. A specific example of a substituted thiazole ligand which may be used in accordance with the invention is 5-methylthiazole. The class (ii) dopant preferably is an iridium coordination complex having ligands each of which are more electropositive than a cyano ligand. In a specifically preferred form the remaining non-thiazole or non-substituted-thiazole ligands of the coordination complexes forming class (ii) dopants are halide ligands.

It is specifically contemplated to select class (ii) dopants from among the coordination complexes containing organic ligands disclosed by Olm et al U.S. Pat. No. 5,360,712; Olm et al U.S. Pat. No. 5,457,021; and Kuromoto et al U.S. Pat. No. 5,462,849.

In a preferred form it is contemplated to employ as a class (ii) dopant a hexacoordination complex satisfying the formula:

$$[IrL^1_6]^{n'} \quad \text{(II)}$$

wherein n' is zero, −1, −2, −3, or −4; and $L^1_6$ represents six bridging ligands which can be independently selected, provided that at least four of the ligands are anionic ligands, each of the ligands is more electropositive than a cyano ligand, and at least one of the ligands comprises a thiazole or substituted thiazole ligand. In a specifically preferred form at least four of the ligands are halide ligands, such as chloride or bromide ligands.

Class (ii) dopant is preferably introduced into the high chloride grains after at least 50 (most preferably 85 and optimally 90) percent of the silver has been precipitated, but before precipitation of the central portion of the grains has been completed. Preferably class (ii) dopant is introduced before 99 (most preferably 97 and optimally 95) percent of the silver has been precipitated. Stated in terms of the fully precipitated grain structure, class (ii) dopant is preferably present in an interior shell region that surrounds at least 50 (most preferably 85 and optimally 90) percent of the silver and, with the more centrally located silver, accounts the entire central portion (99 percent of the silver), most preferably accounts for 97 percent, and optimally accounts for 95 percent of the silver halide forming the high chloride grains. The class (ii) dopant can be distributed throughout the interior shell region delimited above or can be added as one or more bands within the interior shell region.

Class (ii) dopant can be employed in any conventional useful concentration. A preferred concentration range is from $10^{-9}$ to $10^{-4}$ mole per silver mole. Iridium is most preferably employed in a concentration range of from $\mathbf{10^{-8}}$ to $10^{-5}$ mole per silver mole.

Specific illustrations of class (ii) dopants are the following:

(ii-1) $[IrCl_5(thiazole)]^{-2}$
(ii-2) $[IrCl_4(thiazole)_2]^{-1}$
(ii-3) $[IrBr_5(thiazole)]^{-2}$
(ii-4) $[IrBr_4(thiazole)_2]^{-1}$
(ii-5) $[IrCl_5(5\text{-methylthiazole})]^{-2}$
(ii-6) $[IrCl_4(5\text{-methylthiazole})_2]^{-1}$
(ii-7) $[IrBr_5(5\text{-methylthiazole})]^{-2}$
(ii-8) $[IrBr_4(5\text{-methylthiazole})_2]^{-1}$ In one preferred aspect of the invention in a layer using a magenta dye forming coupler, a class (ii) dopant in combination with an $OsCl_5(NO)$ dopant has been found to produce a preferred result.

Preferred emulsions demonstrating the advantages of the invention can be realized by modifying the precipitation of conventional high chloride silver halide grains having predominantly (>50%) {100} crystal faces by employing a combination of class (i) and (ii) dopants as described above.

The silver halide grains precipitated contain greater than 50 mole percent chloride, based on silver. Preferably the grains contain at least 70 mole percent chloride and, optimally at least 90 mole percent chloride, based on silver. Iodide can be present in the grains up to its solubility limit, which is in silver iodochloride grains, under typical conditions of precipitation, about 11 mole percent, based on silver. It is preferred for most photographic applications to limit iodide to less than 5 mole percent iodide, most preferably less than 2 mole percent iodide, based on silver.

Silver bromide and silver chloride are miscible in all proportions. Hence, any portion, up to 50 mole percent, of the total halide not accounted for chloride and iodide, can be bromide. For color reflection print (i.e., color paper) uses bromide is typically limited to less than 10 mole percent based on silver and iodide is limited to less than 1 mole percent based on silver.

In a widely used form high chloride grains are precipitated to form cubic grains—that is, grains having {100} major faces and edges of equal length. In practice ripening effects usually round the edges and comers of the grains to some extent. However, except under extreme ripening conditions substantially more than 50 percent of total grain surface area is accounted for by {100} crystal faces.

High chloride tetradecahedral grains are a common variant of cubic grains. These grains contain 6 {100} crystal faces and 8 {111} crystal faces. Tetradecahedral grains are within the contemplation of this invention to the extent that greater than 50 percent of total surface area is accounted for by {100} crystal faces.

Although it is common practice to avoid or minimize the incorporation of iodide into high chloride grains employed in color paper, it is has been recently observed that silver iodochloride grains with {100} crystal faces and, in some instances, one or more {111} faces offer exceptional levels of photographic speed. In the these emulsions iodide is incorporated in overall concentrations of from 0.05 to 3.0 mole percent, based on silver, with the grains having a surface shell of greater than 50 Å that is substantially free of iodide and an interior shell having a maximum iodide concentration that surrounds a core accounting for at least 50 percent of total silver. Such grain structures are illustrated by Chen et al EPO 0 718 679.

In another improved form the high chloride grains can take the form of tabular grains having {100} major faces. Preferred high chloride {100} tabular grain emulsions are those in which the tabular grains account for at least 70 (most preferably at least 90) percent of total grain projected area. Preferred high chloride {100} tabular grain emulsions have average aspect ratios of at least 5 (most preferably at least >8). Tabular grains typically have thicknesses of less than 0.3 $\mu$m, preferably less than 0.2 $\mu$m, and optimally less than 0.07 $\mu$m. High chloride {100} tabular grain emulsions and their preparation are disclosed by Maskasky U.S. Pat. Nos. 5,264,337 and 5,292,632; House et al U.S. Pat. No. 5,320,938; Brust et al U.S. Pat. No. 5,314,798; and Chang et al U.S. Pat. No. 5,413,904.

Once high chloride grains having predominantly {100} crystal faces have been precipitated with a combination of class (i) and class (ii) dopants described above, chemical and spectral sensitization, followed by the addition of conventional addenda to adapt the emulsion for the imaging application of choice can take any convenient conventional form. These conventional features are illustrated by Research Disclosure, Item 38957, cited above, particularly:

III. Emulsion washing;

IV. Chemical sensitization;

V. Spectral sensitization and desensitization;

VII. Antifoggants and stabilizers;

VIII. Absorbing and scattering materials;

IX. Coating and physical property modifying addenda; and

X. Dye image formers and modifiers.

Some additional silver halide, typically less than 1 percent, based on total silver, can be introduced to facilitate chemical sensitization. It is also recognized that silver halide can be epitaxially deposited at selected sites on a host grain to increase its sensitivity. For example, high chloride {100} tabular grains with comer epitaxy are illustrated by Maskasky U.S. Pat. No. 5,275,930. For the purpose of providing a clear demarcation, the term "silver halide grain" is herein employed to include the silver necessary to form the grain up to the point that the final {100} crystal faces of the grain are formed. Silver halide later deposited that does not overlie the {100} crystal faces previously formed accounting for at least 50 percent of the grain surface area is excluded in determining total silver forming the silver halide grains. Thus, the silver forming selected site epitaxy is not part of the silver halide grains while silver halide that deposits and provides the final {100 } crystal faces of the grains is included in the total silver forming the grains, even when it differs significantly in composition from the previously precipitated silver halide.

Image dye-forming couplers may be included in the element such as couplers that form cyan dyes upon reaction with oxidized color developing agents which are described in such representative patents and publications as: U.S. Pat. Nos. 2,367,531; 2,423,730; 2,474,293; 2,772,162; 2,895,826; 3,002,836; 3,034,892; 3,041,236; 4,883,746 and "Farbkuppler—Eine Literature Ubersicht," published in Agfa Mitteilungen, Band III, pp. 156–175 (1961). Preferably such couplers are phenols and naphthols that form cyan dyes on reaction with oxidized color developing agent. Also preferable are the cyan couplers described in, for instance, European Patent Application Nos. 491,197; 544,322; 556,700; 556,777; 565,096; 570,006; and 574,948.

Typical cyan couplers are represented by the following formulas:

CYAN-1

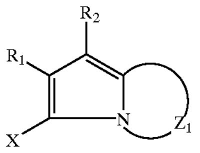

CYAN-2

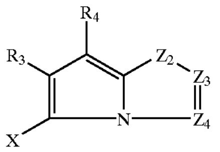

CYAN-3

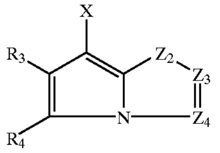

CYAN-4

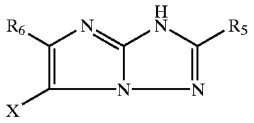

wherein $R_1$, $R_5$ and $R_8$ each represents a hydrogen or a substituent; $R_2$ represents a substituent; $R_3$, $R_4$ and $R_7$ each represents an electron attractive group having a Hammett's substituent constant $\sigma_{para}$ of 0.2 or more and the sum of the $\sigma_{para}$ values of $R_3$ and $R_4$ is 0.65 or more; $R_6$ represents an electron attractive group having a Hammett's substituent constant $\sigma_{para}$ of 0.35 or more; X represents a hydrogen or a coupling-off group; $Z_1$ represents nonmetallic atoms necessary for forming a nitrogen-containing, six-membered, heterocyclic ring which has at least one dissociative group; $Z_2$ represents —C($R_7$)= and —N=; and $Z_3$ and $Z_4$ each represents —C($R_8$)= and —N=.

For purposes of this invention, an "NB coupler" is a dye-forming coupler which is capable of coupling with the developer 4-amino-3-methyl-N-ethyl-N-(2-methanesulfonamidoethyl) aniline sesquisulfate hydrate to form a dye for which the left bandwidth (LBW) of its absorption spectra upon "spin coating" of a 3% w/v solution of the dye in di-n-butyl sebacate solvent is at least 5 nm. less than the LBW for a 3% w/v solution of the same dye in acetonitrile. The LBW of the spectral curve for a dye is the distance between the left side of the spectral curve and the wavelength of maximum absorption measured at a density of half the maximum.

The "spin coating" sample is prepared by first preparing a solution of the dye in di-n-butyl sebacate solvent (3% w/v). If the dye is insoluble, dissolution is achieved by the addition of some methylene chloride. The solution is filtered and 0.1–0.2 ml is applied to a clear polyethylene terephthalate support (approximately 4 cm×4 cm) and spun at 4,000 RPM using the Spin Coating equipment, Model No. EC101, available from Headway Research Inc., Garland Tex. The transmission spectra of the so prepared dye samples are then recorded.

Preferred "NB couplers" form a dye which, in n-butyl sebacate, has a LBW of the absorption spectra upon "spin coating" which is at least 15 nm, preferably at least 25 nm, less than that of the same dye in a 3% solution (w/v) in acetonitrile.

In a preferred embodiment the cyan dye-forming "NB coupler" useful in the invention has the formula (IA)

(IA)

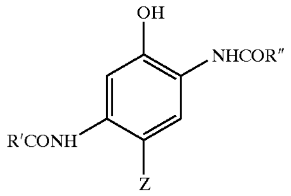

wherein

R' and R" are substituents selected such that the coupler is a "NB coupler", as herein defined; and Z is a hydrogen atom or a group which can be split off by the reaction of the coupler with an oxidized color developing agent.

The coupler of formula (IA) is a 2,5-diamido phenolic cyan coupler wherein the substituents R' and R" are preferably independently selected from unsubstituted or substituted alkyl, aryl, amino, alkoxy and heterocyclyl groups.

In a further preferred embodiment, the "NB coupler" has the formula (I):

(I)

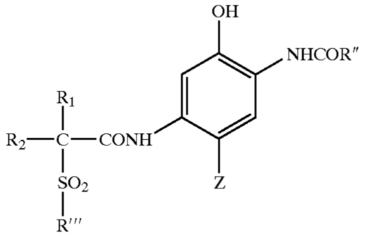

wherein

R" and R'" are independently selected from unsubstituted or substituted alkyl, aryl, amino, alkoxy and heterocyclyl groups and Z is as hereinbefore defined;

$R_1$ and $R_2$ are independently hydrogen or an unsubstituted or substituted alkyl group; and Typically, R" is an alkyl, amino or aryl group, suitably a phenyl group. R'" is desirably an alkyl or aryl group or a 5–10 membered heterocyclic ring which contains one or more heteroatoms selected from nitrogen, oxygen and sulfur, which ring group is unsubstituted or substituted.

In the preferred embodiment the coupler of formula (I) is a 2,5-diamido phenol in which the 5-amido moiety is an amide of a carboxylic acid which is substituted in the alpha position by a particular sulfone (—SO2—) group, such as, for example, described in U.S. Pat. No. 5,686,235. The sulfone moiety is an unsubstituted or substituted alkylsulfone or a heterocyclyl sulfone or it is an arylsulfone, which is preferably substituted, in particular in the meta and/or para position.

Couplers having these structures of formulae (I) or (IA) comprise cyan dye-forming "NB couplers" which form image dyes having very sharp-cutting dye hues on the short wavelength side of the absorption curves with absorption maxima ($\lambda_{max}$) which are shifted hypsochromically and are generally in the range of 620–645 nm, which is ideally suited for producing excellent color reproduction and high color saturation in color photographic papers.

Referring to formula (I), $R_1$ and $R_2$ are independently hydrogen or an unsubstituted or substituted alkyl group, preferably having from 1 to 24 carbon atoms and in particular 1 to 10 carbon atoms, suitably a methyl, ethyl, n-propyl, isopropyl, butyl or decyl group or an alkyl group substituted with one or more fluoro, chloro or bromo atoms, such as a trifluoromethyl group. Suitably, at least one of $R_1$ and $R_2$ is a hydrogen atom and if only one of $R_1$ and $R_2$ is a hydrogen atom then the other is preferably an alkyl group having 1 to 4 carbon atoms, more preferably one to three carbon atoms and desirably two carbon atoms.

As used herein and throughout the specification unless where specifically stated otherwise, the term "alkyl" refers to an unsaturated or saturated straight or branched chain alkyl group, including alkenyl, and includes aralkyl and cyclic alkyl groups, including cycloalkenyl, having 3–8 carbon atoms and the term 'aryl' includes specifically fused aryl.

In formula (I), R" is suitably an unsubstituted or substituted amino, alkyl or aryl group or a 5–10 membered heterocyclic ring which contains one or more heteroatoms selected from nitrogen, oxygen and sulfur, which ring is unsubstituted or substituted, but is more suitably an unsubstituted or substituted phenyl group.

Examples of suitable substituent groups for this aryl or heterocyclic ring include cyano, chloro, fluoro, bromo, iodo, alkyl- or aryl-carbonyl, alkyl- or aryl-oxycarbonyl, carbonamido, alkyl- or aryl-carbonamido, alkyl- or aryl-sulfonyl, alkyl- or aryl-sulfonyloxy, alkyl- or aryl-oxysulfonyl, alkyl- or aryl-sulfoxide, alkyl- or aryl-sulfamoyl, alkyl- or aryl-sulfonamido, aryl, alkyl, alkoxy, aryloxy, nitro, alkyl- or aryl-ureido and alkyl- or aryl-carbamoyl groups, any of which may be further substituted. Preferred groups are halogen, cyano, alkoxycarbonyl, alkylsulfamoyl, alkyl-sulfonamido, alkylsulfonyl, carbamoyl, alkylcarbamoyl or alkylcarbonamido. Suitably, R" is a 4-chlorophenyl, 3,4-di-chlorophenyl, 3,4-difluorophenyl, 4-cyanophenyl, 3-chloro-4-cyanophenyl, pentafluorophenyl, or a 3- or 4-sulfonamidophenyl group.

In formula (I), when R'" is alkyl it may be unsubstituted or substituted with a substituent such as halogen or alkoxy. When R'" is aryl or a heterocycle, it may be substituted. Desirably it is not substituted in the position alpha to the sulfonyl group.

In formula (I), when R'" is a phenyl group, it may be substituted in the meta and/or para positions with one to three substituents independently selected from the group consisting of halogen, and unsubstituted or substituted alkyl, alkoxy, aryloxy, acyloxy, acylamino, alkyl- or aryl-sulfonyloxy, alkyl- or aryl-sulfamoyl, alkyl- or aryl-sulfamoylamino, alkyl- or aryl-sulfonamido, alkyl- or aryl-ureido, alkyl- or aryl-oxycarbonyl, alkyl- or aryl-oxy-carbonylamino and alkyl- or aryl-carbamoyl groups.

In particular each substituent may be an alkyl group such as methyl, t-butyl, heptyl, dodecyl, pentadecyl, octadecyl or 1,1,2,2-tetramethylpropyl; an alkoxy group such as methoxy, t-butoxy, octyloxy, dodecyloxy, tetradecyloxy, hexadecyloxy or octadecyloxy; an aryloxy group such as phenoxy, 4-t-butylphenoxy or 4-dodecyl-phenoxy; an alkyl- or aryl-acyloxy group such as acetoxy or dodecanoyloxy; an alkyl- or aryl-acylamino group such as acetamido, hexadecanamido or benzamido; an alkyl- or aryl-sulfonyloxy group such as methyl-sulfonyloxy, dodecylsulfonyloxy or 4-methylphenyl-sulfonyloxy; an alkyl- or aryl-sulfamoyl-group such as N-butylsulfamoyl or N-4-t-butylphenylsulfamoyl; an alkyl- or aryl-sulfamoylamino group such as N-butyl-sulfamoylamino or N-4-t-butylphenylsulfamoyl-amino; an alkyl- or aryl-sulfonamido group such as methane-sulfonamido, hexadecanesulfonamido or 4-chlorophenyl-sulfonamido; an alkyl- or aryl-ureido group such as methylureido or phenylureido; an alkoxy- or aryloxy-carbonyl such as methoxycarbonyl or phenoxycarbonyl; an alkoxy- or aryloxy-carbonylamino group such as methoxy-carbonylamino or phenoxycarbonylamino; an alkyl- or aryl-carbamoyl group such as N-butylcarbamoyl or N-methyl-N-dodecylcarbamoyl; or a perfluoroalkyl group such as trifluoromethyl or heptafluoropropyl.

Suitably the above substituent groups have 1 to 30 carbon atoms, more preferably 8 to 20 aliphatic carbon atoms. A desirable substituent is an alkyl group of 12 to 18 aliphatic carbon atoms such as dodecyl, pentadecyl or octadecyl or an alkoxy group with 8 to 18 aliphatic carbon atoms such as dodecyloxy and hexadecyloxy or a halogen such as a meta or para chloro group, carboxy or sulfonamido. Any such groups may contain interrupting heteroatoms such as oxygen to form e.g. polyalkylene oxides.

In formula (I) or (IA) Z is a hydrogen atom or a group which can be split off by the reaction of the coupler with an oxidized color developing agent, known in the photographic art as a 'coupling-off group' and may preferably be hydrogen, chloro, fluoro, substituted aryloxy or mercaptotetrazole, more preferably hydrogen or chloro.

The presence or absence of such groups determines the chemical equivalency of the coupler, i.e., whether it is a 2-equivalent or 4-equivalent coupler, and its particular identity can modify the reactivity of the coupler. Such groups can advantageously affect the layer in which the coupler is coated, or other layers in the photographic recording material, by performing, after release from the coupler, functions such as dye formation, dye hue adjustment, development acceleration or inhibition, bleach acceleration or inhibition, electron transfer facilitation, color correction, and the like.

Representative classes of such coupling-off groups include, for example, halogen, alkoxy, aryloxy, heterocyclyloxy, sulfonyloxy, acyloxy, acyl, heterocyclylsulfonamido, heterocyclylthio, benzothiazolyl, phosophonyloxy, alkylthio, arylthio, and arylazo. These coupling-off groups are described in the art, for example, in U.S. Pat. Nos. 2,455,169; 3,227,551; 3,432,521; 3,467,563; 3,617,291; 3,880,661; 4,052,212; and 4,134,766; and in U.K. Patent Nos. and published applications 1,466,728; 1,531,927; 1,533,039; 2,066,755A, and 2,017,704A. Halogen, alkoxy and aryloxy groups are most suitable.

Examples of specific coupling-off groups are —Cl, —F, —Br, —SCN, $—OCH_3$, $—OC_6H_5$, $—OCH_2C({=}O)NHCH_2CH_2OH$, $—OCH_2C(O)NHCH_2CH_2OCH_3$, $—OCH_2C(O)NHCH_2CH_2OC({=}O)OCH_3$, $—P({=}O)(OC_2H_5)_2$, $—SCH_2CH_2COOH$,

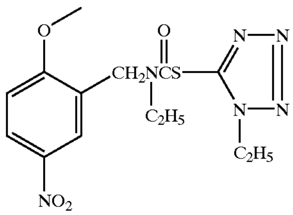

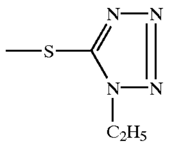

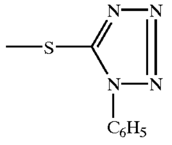

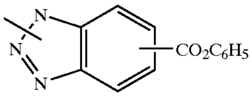

-continued

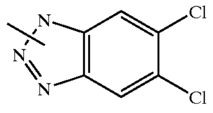

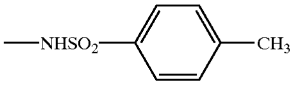

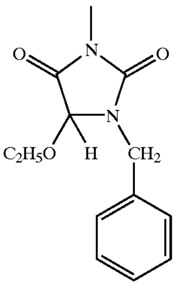

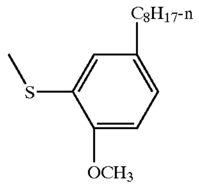

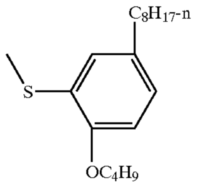

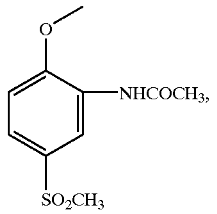

and

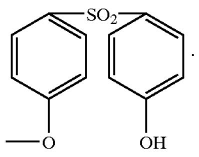

Typically, the coupling-off group is a chlorine atom, hydrogen atom or p-methoxyphenoxy group.

It is essential that the substituent groups be selected so as to adequately ballast the coupler and the resulting dye in the organic solvent in which the coupler is dispersed. The ballasting may be accomplished by providing hydrophobic substituent groups in one or more of the substituent groups. Generally a ballast group is an organic radical of such size and configuration as to confer on the coupler molecule sufficient bulk and aqueous insolubility as to render the coupler substantially nondiffusible from the layer in which it is coated in a photographic element. Thus the combination of substituent are suitably chosen to meet these criteria. To be effective, the ballast will usually contain at least 8 carbon atoms and typically contains 10 to 30 carbon atoms. Suitable ballasting may also be accomplished by providing a plurality of groups which in combination meet these criteria. In the preferred embodiments of the invention $R_1$ in formula (I) is a small alkyl group or hydrogen. Therefore, in these embodiments the ballast would be primarily located as part of the other groups. Furthermore, even if the coupling-off group Z contains a ballast it is often necessary to ballast the other substituents as well, since Z is eliminated from the molecule upon coupling; thus, the ballast is most advantageously provided as part of groups other than Z.

The following examples further illustrate preferred couplers of the invention. It is not to be construed that the present invention is limited to these examples.

IC-1

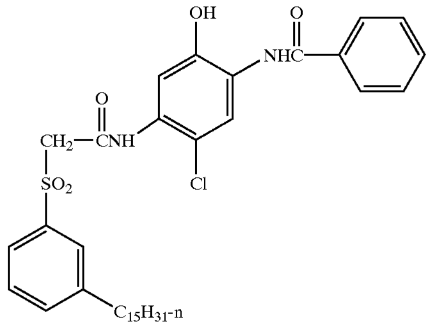

IC-2

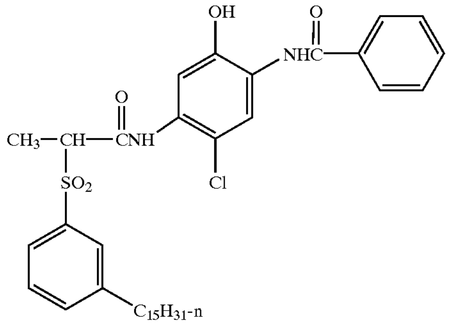

IC-3

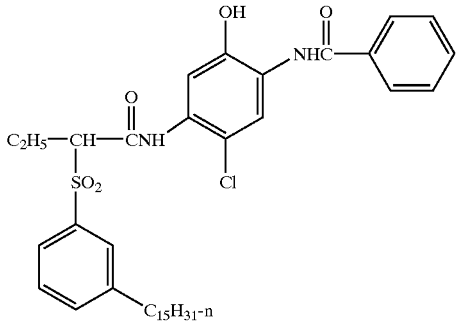

IC-4

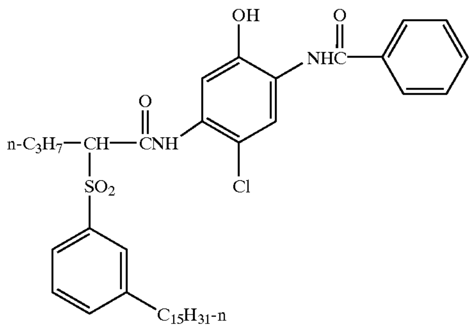

-continued
IC-5
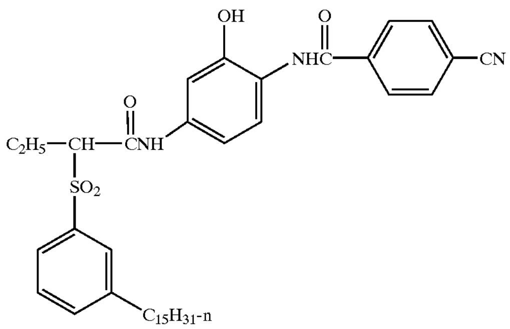
IC-6
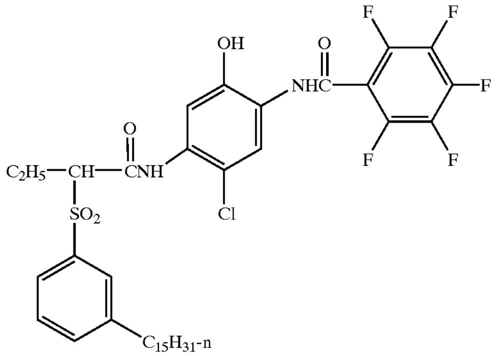
IC-7
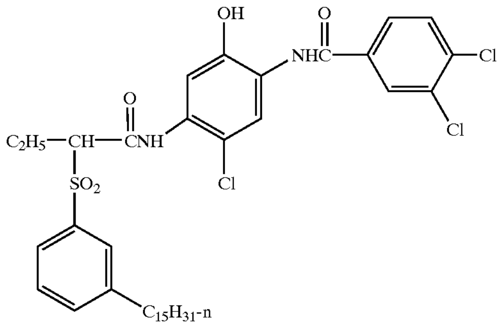
IC-8
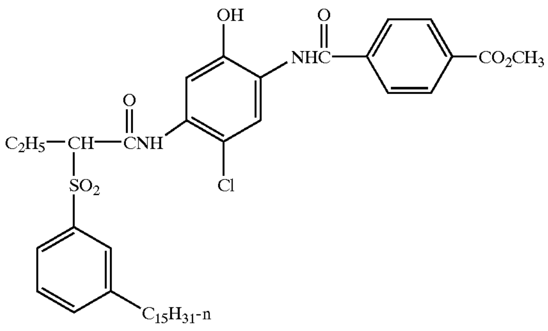
-continued
IC-9
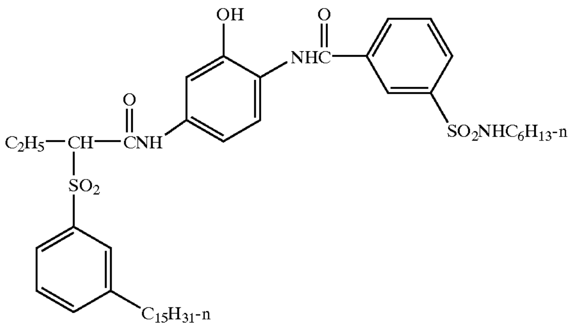
IC-10
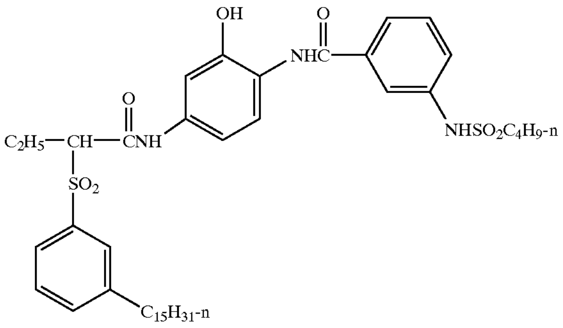
IC-11
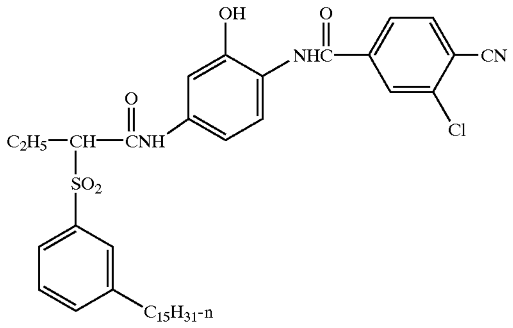
IC-12
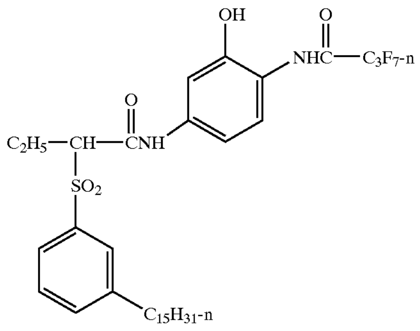

-continued
IC-13
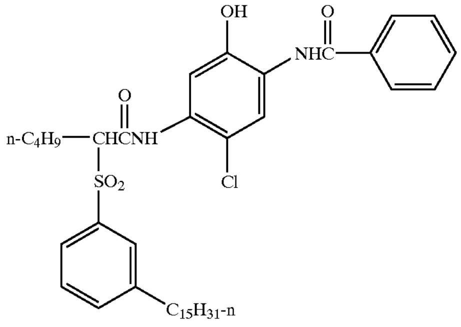
IC-14
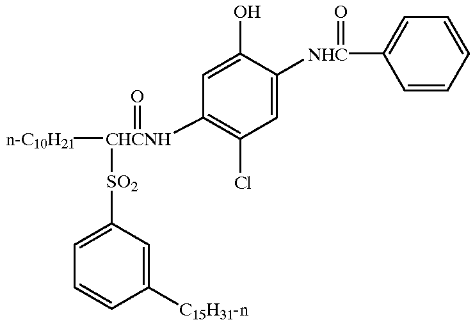
IC-15
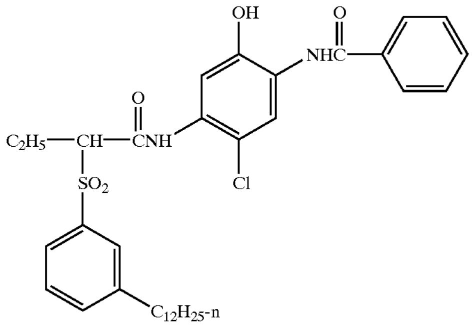
IC-16
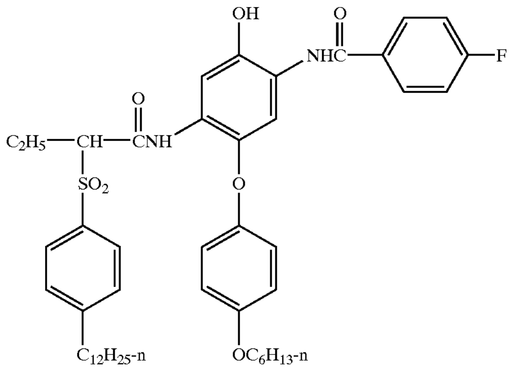
-continued
IC-17
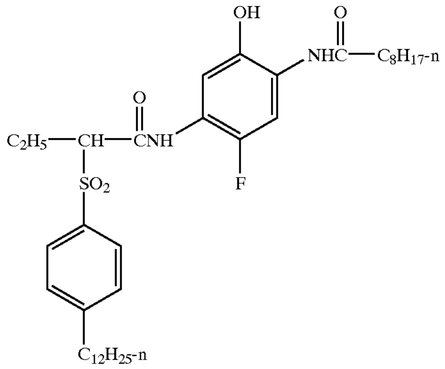
IC-18
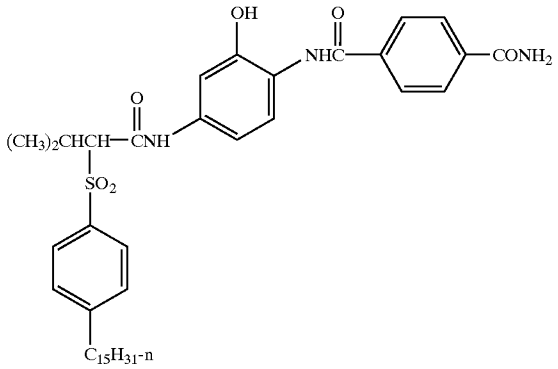
IC-19
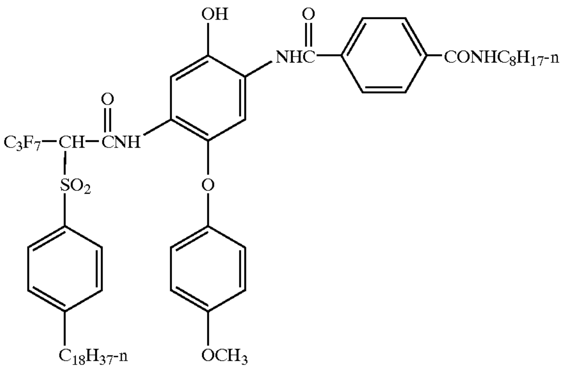
IC-20
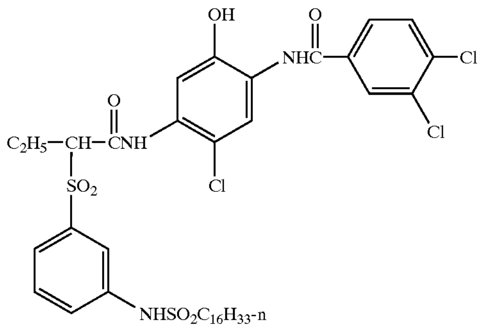

-continued
IC-21
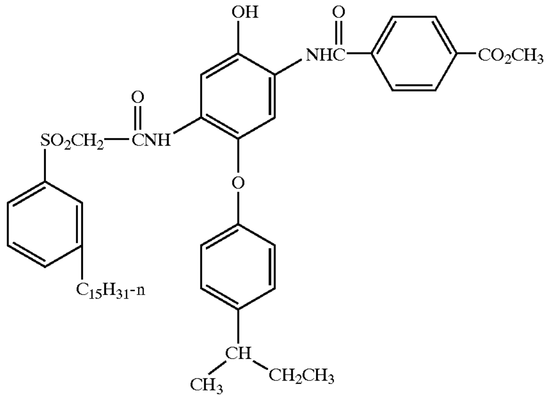
IC-22
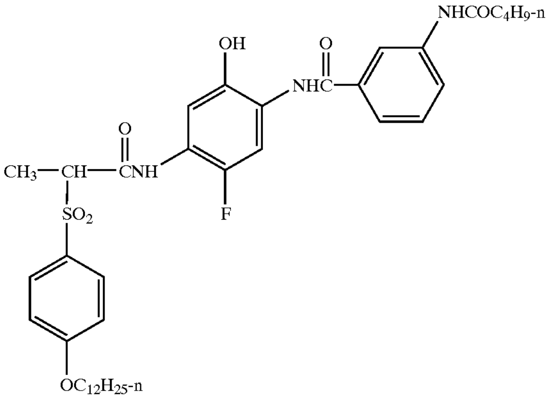
IC-23
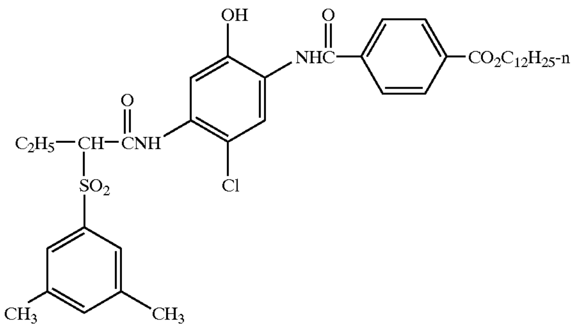
IC-24
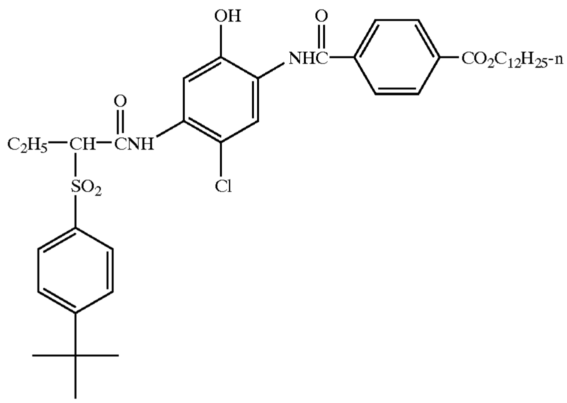
-continued
IC-25
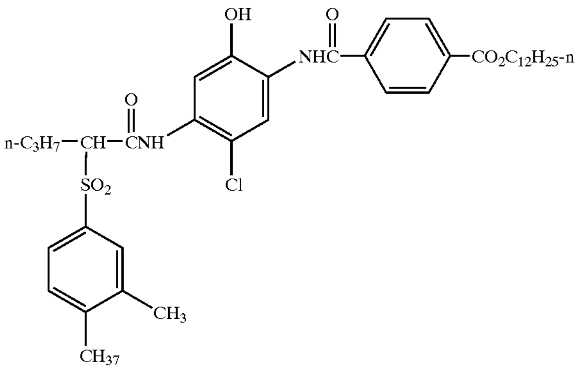
IC-26
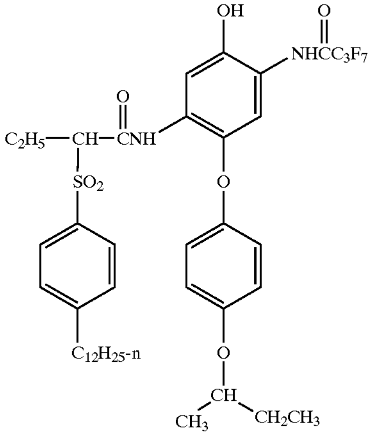
IC-27
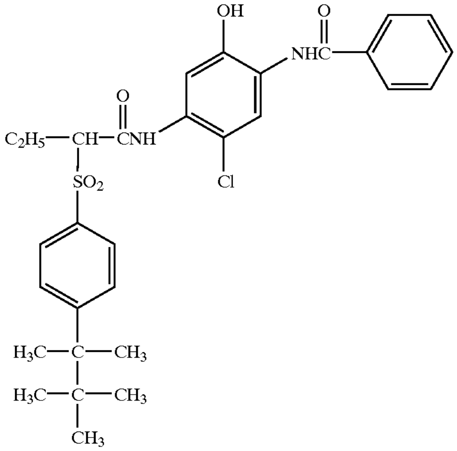
IC-28
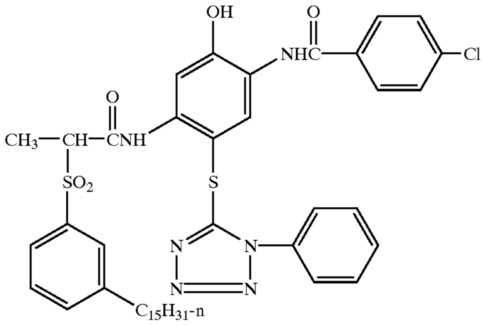

-continued
IC-29
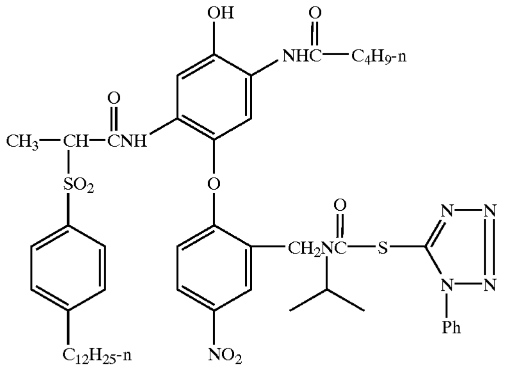
IC-30
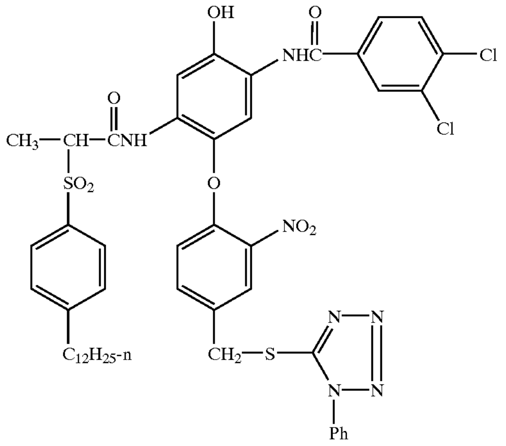
IC-31
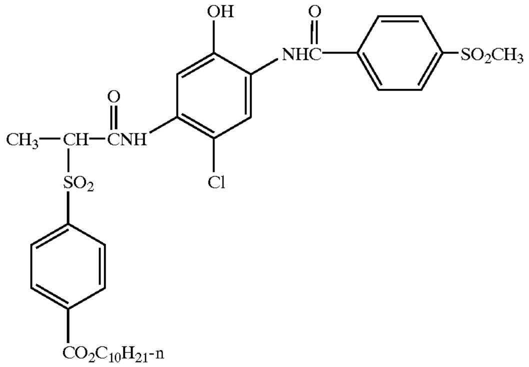
IC-32
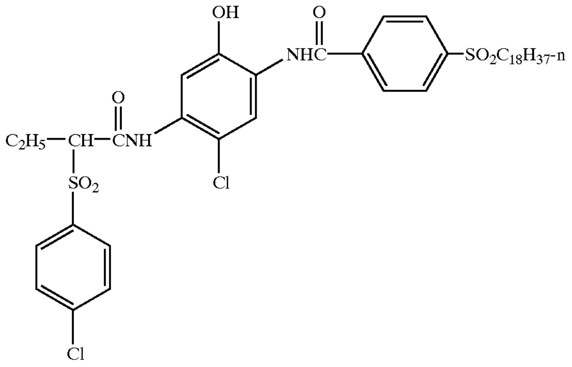
-continued
IC-33
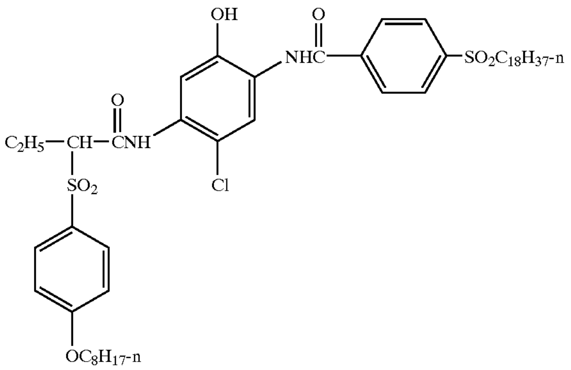
IC-34
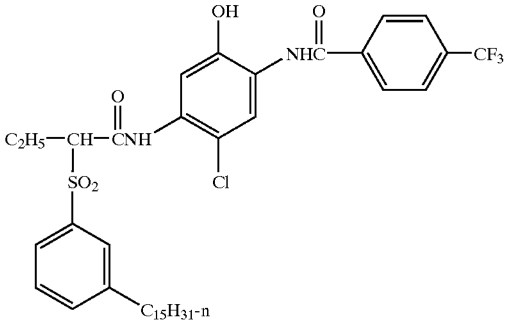
IC-35
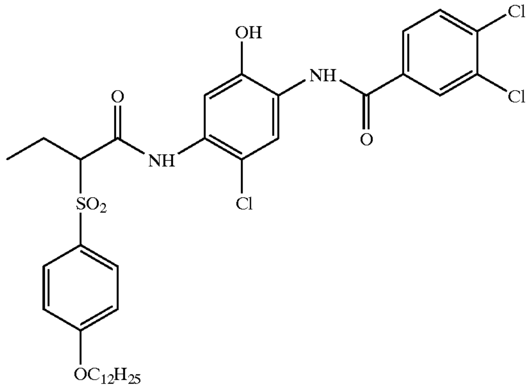
IC-36
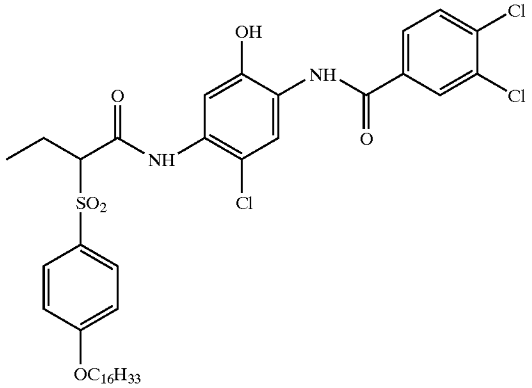

-continued

IC-37

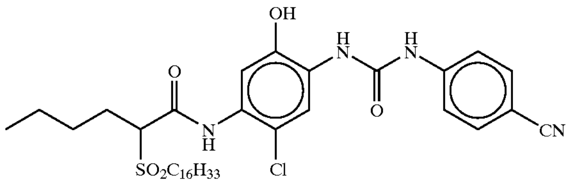

IC-38

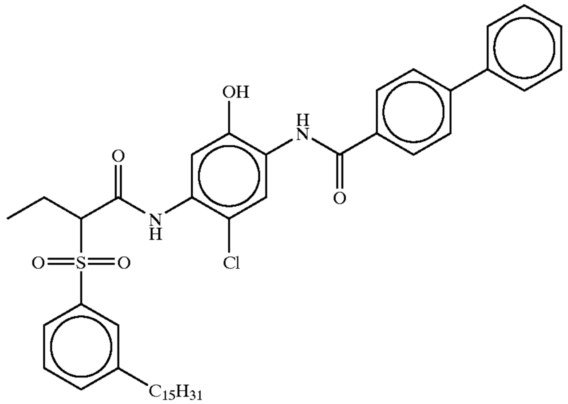

IC-39

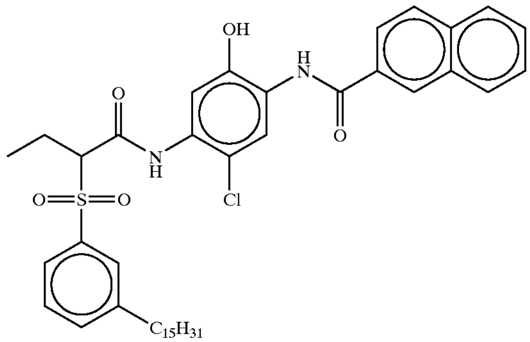

IC-40

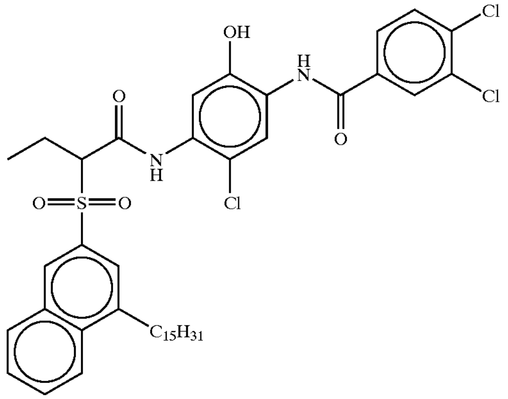

Preferred couplers are IC-3, IC-7, IC-35, and IC-36 because of their suitably narrow left bandwidths.

Couplers that form magenta dyes upon reaction with oxidized color developing agent are described in such representative patents and publications as: U.S. Pat. Nos. 2,311,082; 2,343,703; 2,369,489; 2,600,788; 2,908,573; 3,062,653; 3,152,896; 3,519,429; 3,758,309; and "Farbkuppler-eine Literature Ubersicht," published in Agfa Mitteilungen, Band III, pp. 126–156 (1961). Preferably such couplers are pyrazolones, pyrazolotriazoles, or pyrazolobenzimidazoles that form magenta dyes upon reaction with oxidized color developing agents. Especially preferred couplers are 1H-pyrazolo [5,1-c]-1,2,4-triazole and 1H-pyrazolo [1,5-b]-1,2,4-triazole. Examples of 1H-pyrazolo [5,1-c]-1,2,4-triazole couplers are described in U.K. Patent Nos. 1,247,493; 1,252,418; 1,398,979; U.S. Pat. Nos. 4,443,536; 4,514,490; 4,540,654; 4,590,153; 4,665,015; 4,822,730; 4,945,034; 5,017,465; and 5,023,170. Examples of 1H-pyrazolo [1,5-b]-1,2,4-triazoles can be found in European Patent applications 176,804; 177,765; U.S Pat. Nos. 4,659,652; 5,066,575; and 5,250,400.

Typical pyrazoloazole and pyrazolone couplers are represented by the following formulas:

MAGENTA-1

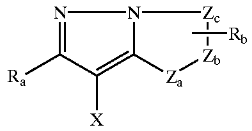

MAGENTA-2

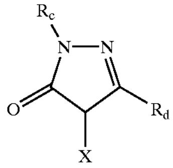

wherein $R_a$ and $R_b$ independently represent H or a substituent; $R_c$ is a substituent (preferably an aryl group); $R_d$ is a substituent (preferably an anilino, carbonamido, ureido, carbamoyl, alkoxy, aryloxycarbonyl, alkoxycarbonyl, or N-heterocyclic group); X is hydrogen or a coupling-off group; and $Z_a$, $Z_b$, and $Z_c$ are independently a substituted methine group, =N—, =C—, or —NH—, provided that one of either the $Z_a$—$Z_b$ bond or the $Z_b$—$Z_c$ bond is a double bond and the other is a single bond, and when the $Z_b$—$Z_c$ bond is a carbon-carbon double bond, it may form part of an aromatic ring, and at least one of $Z_a$, $Z_b$, and $Z_c$ represents a methine group connected to the group $R_b$.

Specific examples of such couplers are:

M-1

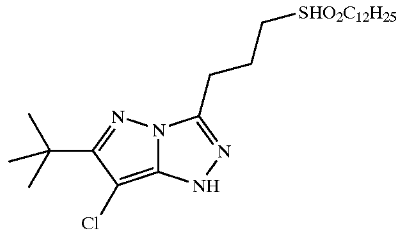

M-2

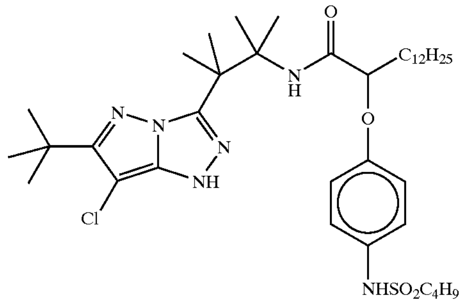

-continued

M-3

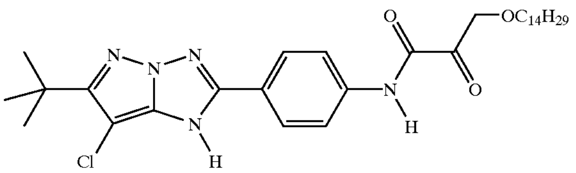

M-4

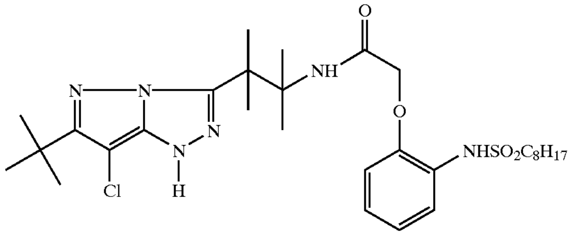

M-5

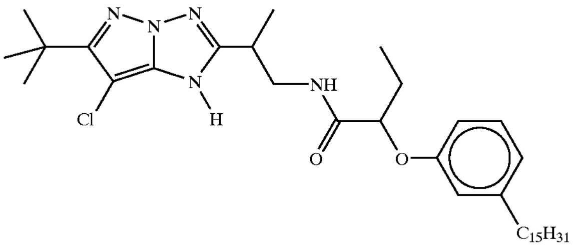

Couplers that form yellow dyes upon reaction with oxidized color developing agent are described in such representative patents and publications as: U.S. Pat. Nos. 2,298,443; 2,407,210; 2,875,057; 3,048,194; 3,265,506; 3,447,928; 3,960,570; 4,022,620; 4,443,536; 4,910,126; and 5,340,703 and “Farbkuppler-eine Literature Ubersicht,” published in Agfa Mitteilungen, Band III, pp. 112–126 (1961). Such couplers are typically open chain ketomethylene compounds. Also preferred are yellow couplers such as described in, for example, European Patent Application Nos. 482,552; 510,535; 524,540; 543,367; and U.S. Pat. No. 5,238,803. For improved color reproduction, couplers which give yellow dyes that cut off sharply on the long wavelength side are particularly preferred (for example, see U.S. Pat. No. 5,360,713).

Typical preferred yellow couplers are represented by the following formulas:

YELLOW-1

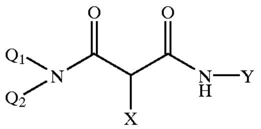

YELLOW-2

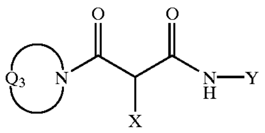

-continued

YELLOW-3

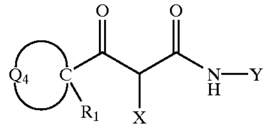

YELLOW-4

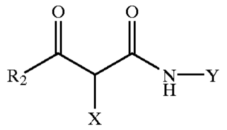

wherein $R_1$, $R_2$, $Q_1$ and $Q_2$ each represents a substituent; X is hydrogen or a coupling-off group; Y represents an aryl group or a heterocyclic group; $Q_3$ represents an organic residue required to form a nitrogen-containing heterocyclic group together with the >N—; and $Q_4$ represents nonmetallic atoms necessary to from a 3- to 5-membered hydrocarbon ring or a 3- to 5-membered heterocyclic ring which contains at least one hetero atom selected from N, O, S, and P in the ring. Particularly preferred is when $Q_1$ and $Q_2$ each represents an alkyl group, an aryl group, or a heterocyclic group, and $R_2$ represents an aryl or tertiary alkyl group.

Preferred yellow couplers can be of the following general structures

Y-1

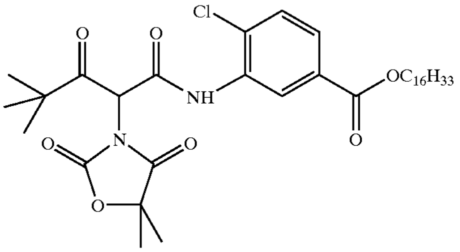

Y-2

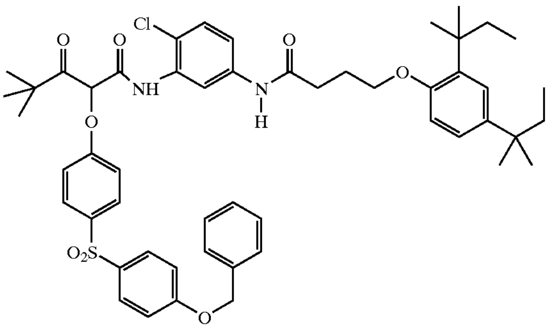

Y-3

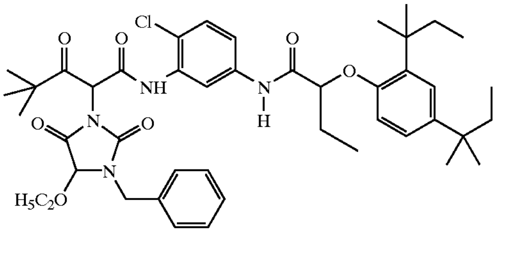

-continued

Y-4

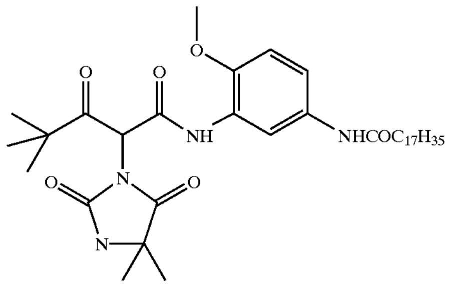

Y-5

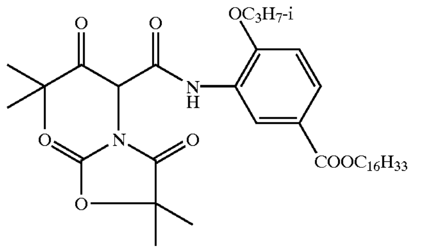

Y-6

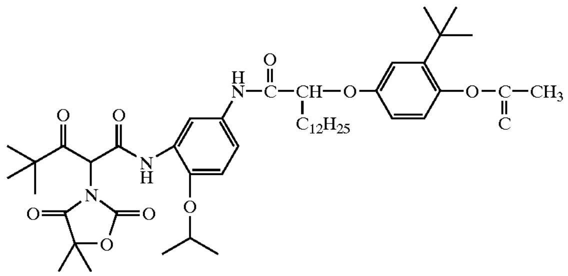

Unless otherwise specifically stated, substituent groups which may be substituted on molecules herein include any groups, whether substituted or unsubstituted, which do not destroy properties necessary for photographic utility. When the term "group" is applied to the identification of a substituent containing a substitutable hydrogen, it is intended to encompass not only the substituent's unsubstituted form, but also its form further substituted with any group or groups as herein mentioned. Suitably, the group may be halogen or may be bonded to the remainder of the molecule by an atom of carbon, silicon, oxygen, nitrogen, phosphorous, or sulfur. The substituent may be, for example, halogen, such as chlorine, bromine or fluorine; nitro; hydroxyl; cyano; carboxyl; or groups which may be further substituted, such as alkyl, including straight or branched chain alkyl, such as methyl, trifluoromethyl, ethyl, t-butyl, 3-(2,4-di-t-pentylphenoxy)propyl, and tetradecyl; alkenyl, such as ethylene, 2-butene; alkoxy, such as methoxy, ethoxy, propoxy, butoxy, 2-methoxyethoxy, sec-butoxy, hexyloxy, 2-ethylhexyloxy, tetradecyloxy, 2-(2,4-di-t-pentylphenoxy) ethoxy, and 2-dodecyloxyethoxy; aryl such as phenyl, 4-t-butylphenyl, 2,4,6-trimethylphenylnaphthyl; aryloxy, such as phenoxy, 2-methylphenoxy, alpha- or beta-naphthyloxy, and 4-tolyloxy; carbonamido, such as acetamido, benzamido, butyramido, tetradecanamido, alpha-(2,4-di-t-pentyl-phenoxy)acetamido, alpha-(2,4-di-t-pentylphenoxy) butyramido, alpha-(3-pentadecylphenoxy)-hexanamido, alpha-(4-hydroxy-3-t-butylphenoxy)-tetradecanamido, 2-oxo-pyrrolidin-1-yl, 2-oxo-5-tetradecylpyrrolin-1-yl, N-methyltetradecanamido, N-succinimido, N-phthalimido, 2,5-dioxo-1-oxazolidinyl, 3-dodecyl-2,5-dioxo-1-imidazolyl, and N-acetyl-N-dodecylamino, ethoxycarbonylamino, phenoxycarbonylamino, benzyloxycarbonylamino, hexadecyloxycarbonylamino, 2,4-di-t-butylphenoxycarbonylamino, phenylcarbonylamino, 2,5-(di-t-pentylphenyl) carbonylamino, p-dodecyl-phenylcarbonylamino, p-toluylcarbonylamino, N-methylureido, N,N-dimethylureido, N-methyl-N-dodecylureido, N-hexadecylureido, N,N-dioctadecylureido, N,N-dioctyl-N'-ethylureido, N-phenylureido, N,N-diphenylureido, N-phenyl-N-p-toluylureido, N-(m-hexadecylphenyl)ureido, N,N-(2,5-di-t-pentylphenyl)-N'-ethylureido, and t-butylcarbonamido; sulfonamido, such as methylsulfonamido, benzenesulfonamido, p-toluylsulfonamido, p-dodecylbenzenesulfonamido, N-methyltetradecylsulfonamido, N,N-dipropyl-sulfamoylamino, and hexadecylsulfonamido; sulfamoyl, such as N-methylsulfamoyl, N-ethylsulfamoyl, N,N-dipropylsulfamoyl, N-hexadecylsulfamoyl, N,N-dimethylsulfamoyl; N-[3-(dodecyloxy)propyl]sulfamoyl, N-[4-(2,4-di-t-pentylphenoxy)butyl]sulfamoyl, N-methyl-N-tetradecylsulfamoyl, and N-dodecylsulfamoyl; carbamoyl, such as N-methylcarbamoyl, N,N-dibutylcarbamoyl, N-octadecylcarbamoyl, N-[4-(2,4-di-t-pentylphenoxy)butyl]carbamoyl, N-methyl-N-tetradecylcarbamoyl, and N,N-dioctylcarbamoyl; acyl, such as acetyl, (2,4-di-t-amylphenoxy)acetyl, phenoxycarbonyl, p-dodecyloxyphenoxycarbonyl, methoxycarbonyl, butoxycarbonyl, tetradecyloxycarbonyl, ethoxycarbonyl, benzyloxycarbonyl, 3-pentadecyloxycarbonyl, and dodecyloxycarbonyl; sulfonyl, such as methoxysulfonyl, octyloxysulfonyl, tetradecyloxysulfonyl, 2-ethylhexyloxysulfonyl, phenoxysulfonyl, 2,4-di-t-pentylphenoxysulfonyl, methylsulfonyl, octylsulfonyl, 2-ethylhexylsulfonyl, dodecylsulfonyl, hexadecylsulfonyl, phenylsulfonyl, 4-nonylphenylsulfonyl, and p-toluylsulfonyl; sulfonyloxy, such as dodecylsulfonyloxy, and hexadecylsulfonyloxy; sulfinyl, such as methylsulfinyl, octylsulfinyl, 2-ethylhexylsulfinyl, dodecylsulfinyl, hexadecylsulfinyl, phenylsulfinyl, 4-nonylphenylsulfinyl, and p-toluylsulfinyl; thio, such as ethylthio, octylthio, benzylthio, tetradecylthio, 2-(2,4-di-t-pentylphenoxy) ethylthio, phenylthio, 2-butoxy-5-t-octylphenylthio, and p-tolylthio; acyloxy, such as acetyloxy, benzoyloxy, octadecanoyloxy, p-dodecylamidobenzoyloxy, N-phenylcarbamoyloxy, N-ethylcarbamoyloxy, and cyclohexylcarbonyloxy; amino, such as phenylanilino, 2-chloroanilino, diethylamino, dodecylamino; imino, such as 1 (N-phenylimido)ethyl, N-succinimido or 3-benzylhydantoinyl; phosphate, such as dimethylphosphate and ethylbutylphosphate; phosphite, such as diethyl and dihexylphosphite; a heterocyclic group, a heterocyclic oxy group or a heterocyclic thio group, each of which may be substituted and which contain a 3- to 7-membered heterocyclic ring composed of carbon atoms and at least one hetero atom selected from the group consisting of oxygen, nitrogen and sulfur, such as 2-furyl, 2-thienyl, 2-benzimidazolyloxy or 2-benzothiazolyl; quaternary ammonium, such as triethylammonium; and silyloxy, such as trimethylsilyloxy.

If desired, the substituents may themselves be further substituted one or more times with the described substituent groups. The particular substituents used may be selected by those skilled in the art to attain the desired photographic properties for a specific application and can include, for example, hydrophobic groups, solubilizing groups, blocking groups, releasing or releasable groups, etc. Generally, the above groups and substituents thereof may include those having up to 48 carbon atoms, typically 1 to 36 carbon atoms and usually less than 24 carbon atoms, but greater numbers are possible depending on the particular substituents selected.

Representative substituents on ballast groups include alkyl, aryl, alkoxy, aryloxy, alkylthio, hydroxy, halogen, alkoxycarbonyl, aryloxcarbonyl, carboxy, acyl, acyloxy, amino, anilino, carbonamido, carbamoyl, alkylsulfonyl, arylsulfonyl, sulfonamido, and sulfamoyl groups wherein the substituents typically contain 1 to 42 carbon atoms. Such substituents can also be further substituted.

Stabilizers and scavengers that can be used in these photographic elements, but are not limited to, the following.

ST-1

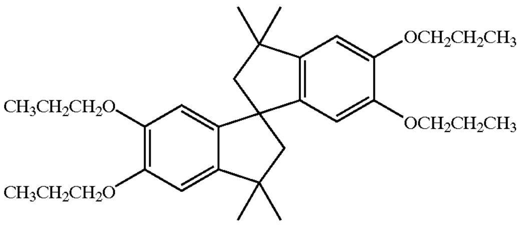

ST-2

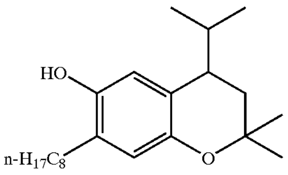

ST-3

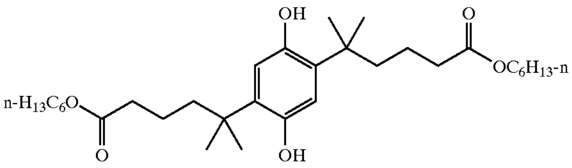

ST-4

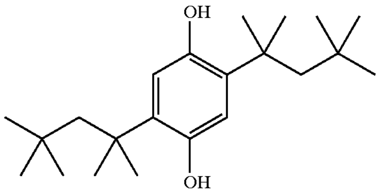

ST-5

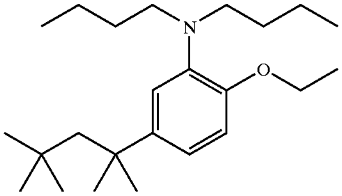

ST-6

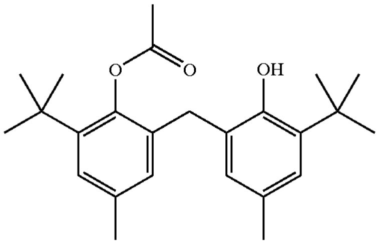

-continued

ST-7

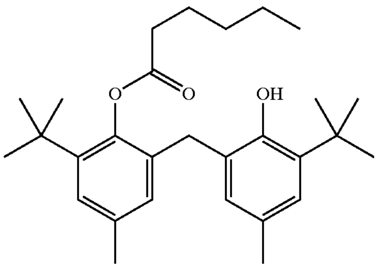

ST-8

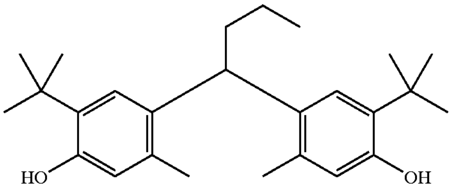

ST-9

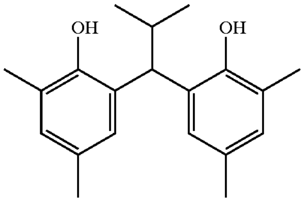

ST-10

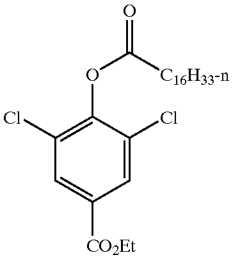

ST-11

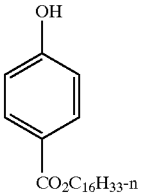

ST-12

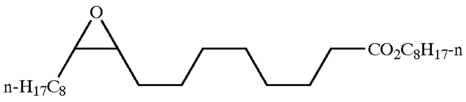

ST-13

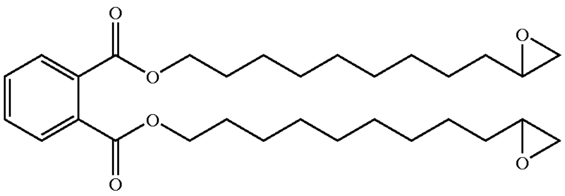

-continued

ST-14

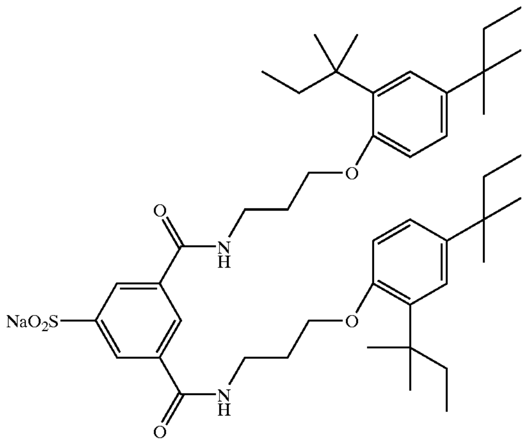

ST-15

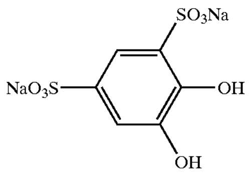

ST-16

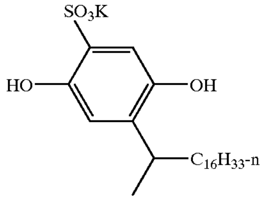

ST-17

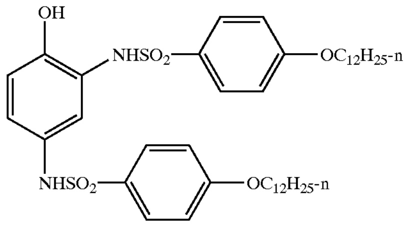

ST-18

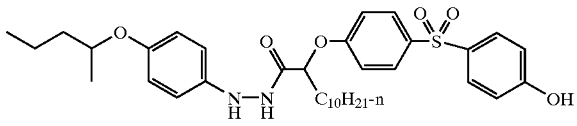

ST-19

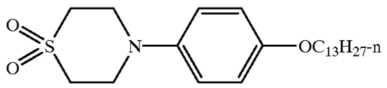

ST-20

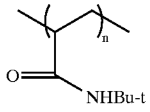

n = 75–8,000

ST-21

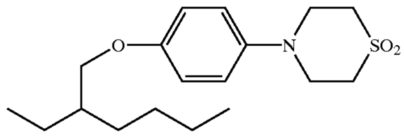

-continued

ST-22

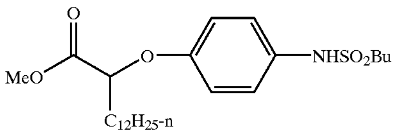

ST-23

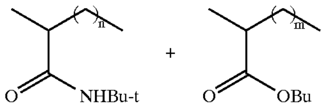

ST-24

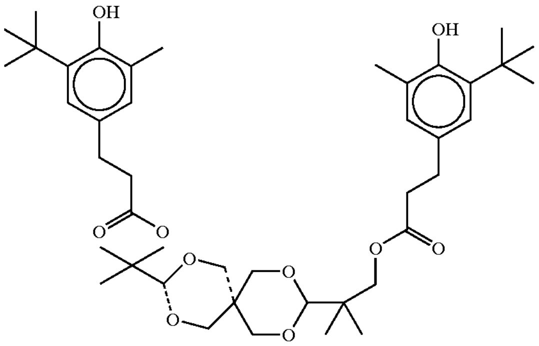

Examples of solvents which may be used in the invention include the following:

| | |
|---|---|
| Tritolyl phosphate | S-1 |
| Dibutyl phthalate | S-2 |
| Diundecyl phthalate | S-3 |
| N,N-Diethyldodecanamide | S-4 |
| N,N-Dibutyldodecanamide | S-5 |
| Tris(2-ethylhexyl)phosphate | S-6 |
| Acetyl tributyl citrate | S-7 |
| 2,4-Di-tert-pentylphenol | S-8 |
| 2-(2-Butoxyethoxy)ethyl acetate | S-9 |
| 1,4-Cyclohexyldimethylene bis(2-ethylhexanoate) | S-10 |

The dispersions used in photographic elements may also include ultraviolet (UV) stabilizers and so called liquid UV stabilizers such as described in U.S. Pat. Nos. 4,992,358; 4,975,360; and 4,587,346. Examples of UV stabilizers are shown below.

UV-1

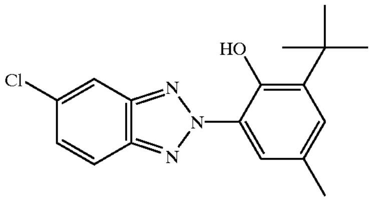

UV-2

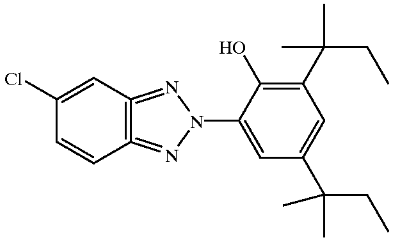

-continued

UV-3

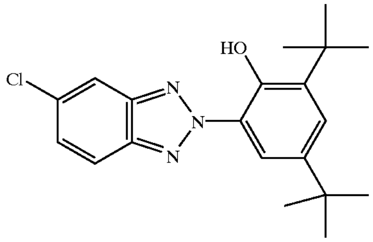

UV-4

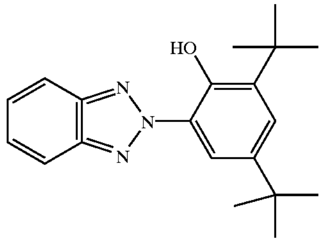

UV-5

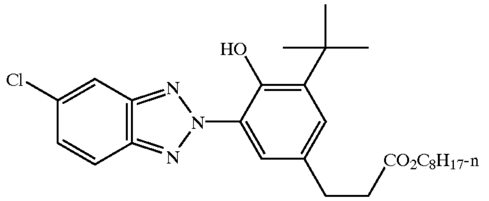

UV-6

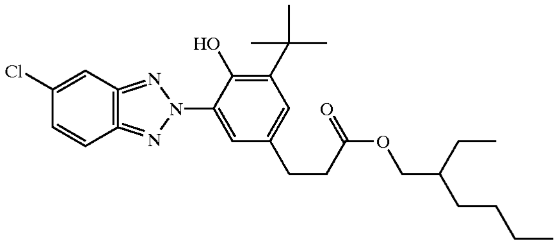

UV-7

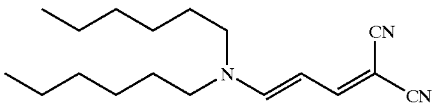

UV-8

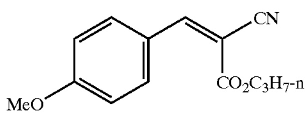

The aqueous phase may include surfactants. Surfactant may be cationic, anionic, zwitterionic or non-ionic. Useful surfactants include, but are not limited to, the following.

SF-1

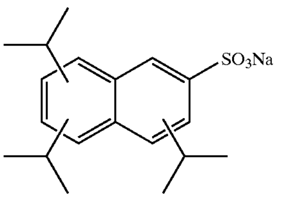

SF-2

$CF_3 \bullet (CF_2)_7 \bullet SO_3Na$

-continued

SF-3

$CH_3 \bullet (CH_2)_n \bullet SO_3Na$, n = 12–14

SF-4

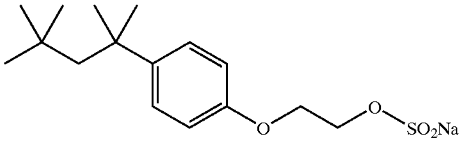

SF-5

$CH_3 \bullet (CH_2)_{11} \bullet OSO_3Na$

SF-6

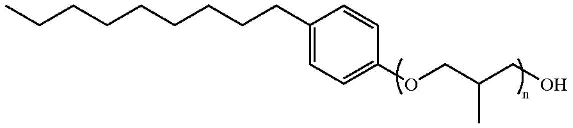

n = ca. 10

SF-7

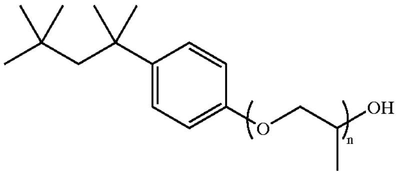

n = ca. 40

SF-8

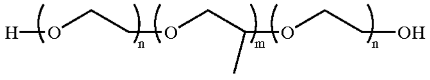

n = ca. 6, m = ca. 2

SF-9

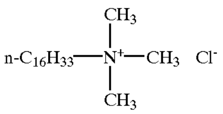

SF-10

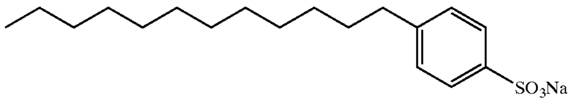

SF-11

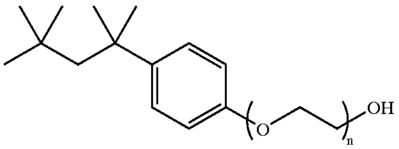

n = ca. 10

SF-12

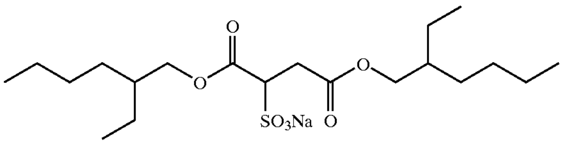

Further, it is contemplated to stabilize photographic dispersions prone to particle growth through the use of hydrophobic, photographically inert compounds such as disclosed by Zengerle et al U.S. Pat. No. 5,468,604.

In a preferred embodiment the invention employs recording elements which are constructed to contain at least three silver halide emulsion layer units. A suitable full color, multilayer format for a recording element used in the invention is represented by Structure I.

STRUCTURE I

| |
|---|
| Red-sensitized |
| cyan dye image-forming silver halide emulsion unit |
| Interlayer |
| Green-sensitized |
| magenta dye image-forming silver halide emulsion unit |
| Interlayer |
| Blue-sensitized |
| yellow dye image-forming silver halide emulsion unit |
| ///// Support ///// |

wherein the red-sensitized, cyan dye image-forming silver halide emulsion unit is situated nearest the support; next in order is the green-sensitized, magenta dye image-forming unit, followed by the uppermost blue-sensitized, yellow dye image-forming unit. The image-forming units are separated from each other by hydrophilic colloid interlayers containing an oxidized developing agent scavenger to prevent color contamination. Silver halide emulsions satisfying the grain and gelatino-peptizer requirements described above can be present in any one or combination of the emulsion layer units. Additional useful multicolor, multilayer formats for an element of the invention include structures as described in U.S. Pat. No. 5,783,373. Each of such structures in accordance with the invention preferably would contain at least three silver halide emulsions comprised of high chloride grains having at least 50 percent of their surface area bounded by {100} crystal faces and containing dopants from classes (i) and (ii), as described above. Preferably each of the emulsion layer units contains emulsion satisfying these criteria.

Conventional features that can be incorporated into multilayer (and particularly multicolor) recording elements contemplated for use in the method of the invention are illustrated by Research Disclosure, Item 38957, cited above:

XI. Layers and layer arrangements

XII. Features applicable only to color negative

XIII. Features applicable only to color positive

B. Color reversal

C. Color positives derived from color negatives

XIV. Scan facilitating features.

The recording elements comprising the radiation sensitive high chloride emulsion layers according to this invention can be conventionally optically printed, or in accordance with a particular embodiment of the invention can be image-wise exposed in a pixel-by-pixel mode using suitable high energy radiation sources typically employed in electronic printing methods. Suitable actinic forms of energy encompass the ultraviolet, visible and infrared regions of the electromagnetic spectrum as well as electron-beam radiation and is conveniently supplied by beams from one or more light emitting diodes or lasers, including gaseous or solid state lasers. Exposures can be monochromatic, orthochromatic, or panchromatic. For example, when the recording element is a multilayer multicolor element, exposure can be provided by laser or light emitting diode beams of appropriate spectral radiation, for example, infrared, red, green or blue wavelengths, to which such element is sensitive. Multicolor elements can be employed which produce cyan, magenta and yellow dyes as a function of exposure in separate portions of the electromagnetic spectrum, including at least two portions of the infrared region, as disclosed in the previously mentioned U.S. Pat. No. 4,619,892. Suitable exposures include those up to 2000 nm, preferably up to 1500 nm. Suitable light emitting diodes and commercially available laser sources are known and commercially available. Imagewise exposures at ambient, elevated or reduced temperatures and/or pressures can be employed within the useful response range of the recording element determined by conventional sensitometric techniques, as illustrated by T. H. James, *The Theory of the Photographic Process,* 4th Ed., Macmillan, 1977, Chapters 4, 6, 17, 18 and 23.

It has been observed that anionic $[MX_xY_yL_z]$ hexacoordination complexes, where M is a group 8 or 9 metal (preferably iron, ruthenium or iridium), X is halide or pseudohalide (preferably Cl, Br or CN) x is 3 to 5, Y is $H_2O$, y is 0 or 1, L is a C—C, H—C or C—N—H organic ligand, and Z is 1 or 2, are surprisingly effective in reducing high intensity reciprocity failure (HIRF), low intensity reciprocity failure (LIRF) and thermal sensitivity variance and in in improving latent image keeping (LIK). As herein employed, HIRF is a measure of the variance of photographic properties for equal exposures, but with exposure times ranging from $10^{-1}$ to $10^{-6}$ second. LIRF is a measure of the varinance of photographic properties for equal exposures, but with exposure times ranging from $10^{-1}$ to 100 seconds. Although these advantages can be generally compatible with face centered cubic lattice grain structures, the most striking improvements have been observed in high (>50 mole %, preferably ≧90 mole %) chloride emulsions. Preferred C—C, H—C or C—N—H organic ligands are aromatic heterocycles of the type described in U.S. Pat. No. 5,462,849. The most effective C—C, H—C or C—N—H organic ligands are azoles and azines, either unsustituted or containing alkyl, alkoxy or halide substituents, where the alkyl moieties contain from 1 to 8 carbon atoms. Particularly preferred azoles and azines include thiazoles, thiazolines and pyrazines.

The quantity or level of high energy actinic radiation provided to the recording medium by the exposure source is generally at least $10^{-4}$ ergs/cm$^2$, typically in the range of about $10^{-4}$ ergs/cm$^2$ to $10^{-3}$ ergs/cm$^2$ and often from $10^{-3}$ ergs/cm$^2$ to $10^2$ ergs/cm$^2$. Exposure of the recording element in a pixel-by-pixel mode as known in the prior art persists for only a very short duration or time. Typical maximum exposure times are up to 100$\mu$ seconds, often up to 10$\mu$ seconds, and frequently up to only 0.5$\mu$ seconds. Single or multiple exposures of each pixel are contemplated. The pixel density is subject to wide variation, as is obvious to those skilled in the art. The higher the pixel density, the sharper the images can be, but at the expense of equipment complexity. In general, pixel densities used in conventional electronic printing methods of the type described herein do not exceed $10^7$ pixels/cm$^2$ and are typically in the range of about $10^4$ to $10^6$ pixels/cm$^2$. An assessment of the technology of high-quality, continuous-tone, color electronic printing using silver halide photographic paper which discusses various features and components of the system, including exposure source, exposure time, exposure level and pixel density and other recording element characteristics is provided in Firth et al., *A Continuous-Tone Laser Color Printer*, Journal of Imaging Technology, Vol. 14, No. 3, June 1988, which is hereby incorporated herein by reference. As previously indicated herein, a description of some of the details of conventional electronic printing methods comprising scanning a recording element with high energy beams such as light emitting diodes or laser beams, are set forth in Hioki U.S. Pat. No. 5,126,235, European Patent Applications 479 167 A1 and 502 508 A1.

Once imagewise exposed, the recording elements can be processed in any convenient conventional manner to obtain a viewable image. Such processing is illustrated by Research Disclosure, Item 38957, cited above:

XVIII. Chemical development systems

XIX. Development

XX. Desilvering, washing, rinsing and stabilizing

In addition, a useful developer for the inventive material is a homogeneous, single part developing agent. The homogeneous, single-part color developing concentrate is prepared using a critical sequence of steps:

In the first step, an aqueous solution of a suitable color developing agent is prepared. This color developing agent is generally in the form of a sulfate salt. Other components of the solution can include an antioxidant for the color developing agent, a suitable number of alkali metal ions (in an at least stoichiometric proportion to the sulfate ions) provided by an alkali metal base, and a photographically inactive water-miscible or water-soluble hydroxy-containing organic solvent. This solvent is present in the final concentrate at a concentration such that the weight ratio of water to the organic solvent is from about 15:85 to about 50:50.

In this environment, especially at high alkalinity, alkali metal ions and sulfate ions form a sulfate salt that is precipitated in the presence of the hydroxy-containing organic solvent. The precipitated sulfate salt can then be readily removed using any suitable liquid/solid phase separation technique (including filtration, centrifugation or decantation). If the antioxidant is a liquid organic compound, two phases may be formed and the precipitate may be removed by discarding the aqueous phase.

The color developing concentrates of this invention include one or more color developing agents that are well known in the art that, in oxidized form, will react with dye forming color couplers in the processed materials. Such color developing agents include, but are not limited to, aminophenols, p-phenylenediamines (especially N,N-dialkyl-p-phenylenediamines) and others which are well known in the art, such as EP 0 434 097A1 (published Jun. 26, 1991) and EP 0 530 921A1 (published Mar. 10, 1993). It may be useful for the color developing agents to have one or more water-solubilizing groups as are known in the art. Further details of such materials are provided in Research Disclosure, publication 38957, pages 592–639 (September 1996). Research Disclosure is a publication of Kenneth Mason Publications Ltd., Dudley House, 12 North Street, Emsworth, Hampshire PO10 7DQ England (also available from Emsworth Design Inc., 121 West 19th Street, New York, N.Y. 10011). This reference will be referred to hereinafter as "Research Disclosure".

Preferred color developing agents include, but are not limited to, N,N-diethyl-p-phenylenediamine sulfate (KODAK Color Developing Agent CD-2), 4-amino-3-methyl-N-(2-methane sulfonamidoethyl)aniline sulfate, 4-(N-ethyl-N-β-hydroxyethylamino)-2-methylaniline sulfate (KODAK Color Developing Agent CD-4), p-hydroxyethylethylaminoaniline sulfate, 4-(N-ethyl-N-2-methanesulfonylaminoethyl)-2-methylphenylenediamine sesquisulfate (KODAK Color Developing Agent CD-3), 4-(N-ethyl-N-2-methanesulfonylaminoethyl)-2-methylphenylenediamine sesquisulfate, and others readily apparent to one skilled in the art.

In order to protect the color developing agents from oxidation, one or more antioxidants are generally included in the color developing compositions. Either inorganic or organic antioxidants can be used. Many classes of useful antioxidants are known, including but not limited to, sulfites (such as sodium sulfite, potassium sulfite, sodium bisulfite and potassium metabisulfite), hydroxylamine (and derivatives thereof), hydrazines, hydrazides, amino acids, ascorbic acid (and derivatives thereof), hydroxamic acids, aminoketones, mono- and polysaccharides, mono- and polyamines, quaternary ammonium salts, nitroxy radicals, alcohols, and oximes. Also useful as antioxidants are 1,4-cyclohexadiones. Mixtures of compounds from the same or different classes of antioxidants can also be used if desired.

Especially useful antioxidants are hydroxylamine derivatives as described for example, in U.S. Pat. Nos. 4,892,804; 4,876,174; 5,354,646; and 5,660,974, all noted above, and U.S. Pat. No. 5,646,327 (Bums et al). Many of these antioxidants are mono- and dialkylhydroxylamines having one or more substituents on one or both alkyl groups. Particularly useful alkyl substituents include sulfo, carboxy, amino, sulfonamido, carbonamido, hydroxy and other solubilizing substituents.

More preferably, the noted hydroxylamine derivatives can be mono- or dialkylhydroxylamines having one or more hydroxy substituents on the one or more alkyl groups. Representative compounds of this type are described for example in U.S. Pat. No. 5,709,982 (Marrese et al), as having the structure I:

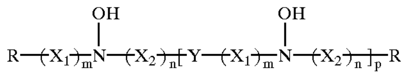

wherein R is hydrogen, a substituted or unsubstituted alkyl group of 1 to 10 carbon atoms, a substituted or unsubstituted hydroxyalkyl group of 1 to 10 carbon atoms, a substituted or unsubstituted cycloalkyl group of 5 to 10 carbon atoms, or a substituted or unsubstituted aryl group having 6 to 10 carbon atoms in the aromatic nucleus.

$X_1$ is $—CR_2(OH)CHR_1—$ and $X_2$ is $—CHR_1CR_2(OH)—$ wherein $R_1$ and $R_2$ are independently hydrogen, hydroxy, a substituted or unsubstituted alkyl group or 1 or 2 carbon atoms, a substituted or unsubstituted hydroxyalkyl group of 1 or 2 carbon atoms, or $R_1$ and $R_2$ together represent the carbon atoms necessary to complete a substituted or unsubstituted 5- to 8-membered saturated or unsaturated carbocyclic ring structure.

Y is a substituted or unsubstituted alkylene group having at least 4 carbon atoms, and has an even number of carbon atoms, or Y is a substituted or unsubstituted divalent aliphatic group having an even total number of carbon and oxygen atoms in the chain, provided that the aliphatic group has a least 4 atoms in the chain.

Also in Structure I, m, n and p are independently 0 or 1. Preferably, each of m and n is 1, and p is 0.

Specific di-substituted hydroxylamine antioxidants include, but are not limited to: N,N-bis(2,3-dihydroxypropyl)hydroxylamine, N,N-bis(2-methyl-2,3-dihydroxypropyl)hydroxylamine and N,N-bis(1-hydroxymethyl-2-hydroxy-3-phenylpropyl)hydroxylamine. The first compound is preferred.

These and other advantages will be apparent from the detailed description below. The following examples illustrate the practice of this invention. They are not intended to be exhaustive of all possible variations of the invention. Parts and percentages are by weight unless otherwise indicated.

EXAMPLES

Example 1

The following is a description of the invention and was prepared by extrusion lamination of biaxially oriented films to a base polyester sheet. A composite sheet of biaxially oriented polypropylene (L2–L6) was extrusion laminated to a 400 micrometer thick sheet of voided polyester which had been primed and gelatin subbed. An extrusion coating grade of Ethyl Methyl Acrylate with rutile $TiO_2$ was melt extruded at 600° F. and used to adhere the topside biaxially oriented sheet polyester base. On the backside of the polyester sheet a metallized biaxially oriented microvoided sheet (L10–L14) was extrusion laminated and adhered to the polyester base using an extrusion coating grade of Ehtyl Methyl Acrylate with rutile $TiO_2$. The EMA layer was coated at 600° F. The composite structure was then extrusion laminated to a 70 micrometer biaxially oriented matte layer polypropylene film. The MLT film was previously printed on the topmost side with a continuous background layer of black ink with a Status A density of 2.5 and then printed with a gold and red logo. The melt extruded adhesion layer (L14–L15) was a coextruded using a thin layer of ethylene acrylic acid (EAA) and a polyethylene carrier. The BAA layer was melted at 450° F., while the low density polyethylene was melted coated at 585° F. A small amount of fluoropolymer was added to each polymer to help minimize interlayer slippage. The entire structure was then antistat coated, and then the opposite or top side was then emulsion coated.

| Layer | Materials in Layer | Thickness μm |
|---|---|---|
| L1 | Photographic Silver Halide Emulsion | |
| L2 | Polyethylene Skin Layer with blue tints and fluoropolymer processing aid | 0.7 |
| L3 | 24% Dupont Rutile R100 $TiO_2$ in Polypropylene with optical brightener and hindered amine light stabilizer (Hostalux KS and Cimabsorb 944) | 6.7 |
| L4 | Microvoided Polypropylene | 30 |
| L5 | 18% DuPont Rutile R100 $TiO_2$ in polypropylene | 6.9 |
| L6 | Polyethylene skin layer | 0.76 |
| L7 | EthylMethylAcrylate melt extruded tie layer with 15% DuPont R100 Rutile $TiO_2$ | 50 |
| L8 | Voided Polyester sheet with gel sub on top and bottom surfaces | 400 |
| L9 | EthylMethylAcrylate melt extruded tie layer with 15% DuPont R100 Rutile $TiO_2$ | 50 |
| L10 | Solid Layer of Polypropylene | 10 |
| L11 | Voided polypropylene | 30 |
| L12 | Solid Layer of Polypropylene | 10 |
| L13 | Vacuum deposited aluminum layer | 8 |
| L14 | Ethylene acrylic acid copolymer (0.91 density and 12 MI) | 10 |
| L15 | 12 Melt Index 0.917 Density Low density polyethylene | 30 |
| L16 | Reverse print logo (2.5 Density Black continuous background, 1.3 Density gold and 1.5 red ink logo) | Not Measured |
| L17 | 70 MLT (Mobil Bicor) | 70 |
| L18 | Antistat layer (Colloid Silica, metal salt in acrylate latex) | Not Measured |

Example 2

The following is a description of the invention and was prepared by extrusion lamination of a biaxially oriented film to a coextruded biaxially orineted voided polyester sheet. A composite sheet of biaxially oriented polypropylene (L2–L6) was extrusion laminated to a 430 micrometer thick sheet of voided polyester which has an integral skin layer on the top and bottom sides. The top side integral skin layer is a solid polyester with a primer and gel sub layer, and the bottom integral layer is a layer of polyester containing 45% by weight Dupont R100 Rutile $TiO_2$ on which a primer and gelatin sub are coated.

| Layer | Materials in Layer | Thickness μm |
|---|---|---|
| L1 | Photographic Silver Halide Emulsion | |
| L2 | Polyethylene Skin Layer with blue tints and fluoropolymer processing aid | 0.7 |
| L3 | 24% DuPont Rutile R100 $TiO_2$ in Polypropylene with optical brightener and hindered amine light stabilizer (Hostalux KS and Cimabsorb 944) | 6.7 |
| L4 | Microvoided Polypropylene | 30 |
| L5 | 18% Dupont Rutile R100 $TiO_2$ in polypropylene | 6.9 |
| L6 | Polyethylene skin layer | 0.76 |
| L7 | EthylMethylAcrylate melt extruded tie layer with 15% DuPont R100 Rutile $TiO_2$ | 50 |
| L8 | Primer and gelatin sub | *NM |
| L9 | Top integral polyester layer | 15 |
| L10 | Voided Polyester sheet with gel sub on top and bottom surfaces | 400 |
| L11 | Bottom Intergal polyester layer with 45% Dupont R100 rutile $TiO_2$ | 15 |
| L12 | Primer and gelatin sub | *NM |
| L13 | Antistat with metal oxide in gelatin | *NM |

*NM: Layer thickness not measured

Sample 3

| Layer | Materials in Layer | Thickness μm |
|---|---|---|
| L1 | Photographic Silver Halide Emulsion | |
| L2 | Polyethylene Skin Layer with blue tints and fluoropolymer processing aid | 0.7 |
| L3 | Microvoided Polypropylene with Optical Brightener | 30 |
| L4 | Polyethylene skin layer | 0.76 |
| L5 | EthylMethylAcrylate melt extruded tie layer | 50 |
| L6 | Primer and gelatin sub | *NM |
| L7 | Voided Polyester | 400 |
| L8 | Primer and gelatin sub | *NM |
| L9 | Low Density polyethylene (0.917 g/cc; 10 MI) | 50 |
| L10 | Polyethylene skin layer | 10 |
| L11 | Microvoided Polypropylene Sheet | 30 |
| L12 | Oriented matte skin layer terpolymer of ethylene, butylene, and propylene | 10 |
| L13 | Antistat layer (Colloid Silica, metal salt in acrylate latex) | *NM |

Sample 3 is a structure using three separate voided polymer sheets to achieve a high degree of opacity without the use of $TiO_2$ or other white pigment. It provides a clear polyolefin spacer between the voided layers to further enhance the opacity of the structure and to minimize any back scatter to the emulsion that may cause secondary exposure. The blue tints and optical brightener provide a high degree of whiteness without the use of $TiO_2$ Sample 4:

| Layer | Materials in Layer | Thickness μm |
|---|---|---|
| L1 | Photographic Silver Halide Emulsion | |
| L2 | Polyethylene Skin Layer with blue tints and fluoropolymer processing aid | 0.7 |
| L3 | 24% DuPont Rutile R100 $TiO_2$ in Polypropylene with optical brightener and hindered amine light stabilizer | 6.7 |
| L4 | Microvoided Polypropylene | 30 |
| L5 | 18% DuPont Rutile R100 $TiO_2$ in polypropylene | 6.9 |
| L6 | Polyethylene skin layer | 0.76 |
| L7 | EthylMethylAcrylate melt extruded tie layer with 15% Dupont R100 Rutile $TiO_2$ | 50 |

-continued

| Layer | Materials in Layer | Thickness μm |
|---|---|---|
| L8 | Clear Polyester sheet with gel sub on top and bottom surfaces | 400 |
| L9 | EthylMethylAcrylate melt extruded tie layer | 50 |
| L10 | Solid Layer of Polypropylene | 10 |
| L11 | Vacuum Deposited Aluminum | 8 |
| L12 | Ethylene acrylic acid copolymer (0.91 density and 12 MI) | 10 |
| L13 | 70 MLT (Mobil Bicor) | 70 |
| L14 | Antistat layer (Colloid Silica, metal salt in acrylate latex) | *NM |

Control:

The control sample of this invention consists of a biaxially oriented microvoided polymer sheet adhered to a solid clear polyester base sheet on the topside and a biaxially oriented sheet on the backside.

| Layer | Materials in Layer | Thickness μm |
|---|---|---|
| L1 | Photographic Silver Halide Emulsion | |
| L2 | Polyethylene Skin Layer with blue tints and fluoropolymer processing aid | 0.7 |
| L3 | 24% DuPont Rutile R100 $TiO_2$ in Polypropylene with optical brightener and hindered amine light stabilizer (Hostalux KS, Cimabsorb 944) | 6.7 |
| L4 | Microvoided Polypropylene | 30 |
| L5 | 18% DuPont Rutile R100 $TiO_2$ in polypropylene with antioxidant | 6.9 |
| L6 | Polyethylene skin layer | 0.76 |
| L7 | EthylMethylAcrylate melt extruded tie layer with 15% DuPont R100 Rutile $TiO_2$ | 50 |
| L8 | Primer and gelatin sub | *NM |
| L9 | Clear Solid Sheet of Polyester | 400 |
| L10 | Primer and gelatin sub | *NM |
| L11 | Low Density polyethylene (0.917 g/cc; 10 MI) | 50 |
| L12 | 70 MLT (Mobil Bicor) | 70 |
| L13 | Antistat layer(Colloid Silica, metal salt in acrylate latex) | *NM |

TABLE 1

| Sample | L* of Base Without Emulsion | % Transmission |
|---|---|---|
| 1 | 94.2 | 0.0 |
| 2 | 93.9 | 1.0 |
| 3 | 93.1 | 2.3 |
| 4 | 86 | 0.0 |
| Control | 93.4 | 23 |

As can be seen in Table 1, when opacifying layers of sufficient thickness and opacity are applied to a voided polyester sheet (samples 1, 2, and 3), the percent transmission is significantly reduced as compared to a thin voided film applied to a clear base (control). The use of opacifying layers below a layer of voids further shields the viewer from unwanted color as is evident in samples 1, 2, and 3. Sample 3 provides a high level of opacity without the use of expensive white pigments. Sample 4 has a clear polyester base with a voided sheet on top and a metallized sheet on the back. The use of the metallized opacifying below the base provides sufficient opacity but as noted in the L* measurement, the thin voided layer above the base is not sufficient to significantly dampen the effective of the dark foil layer when the sample is viewed in reflection. The control sample is similar to sample 4 but does not contain a dark metallic foil layer. As noted by the L* and opacity, sample 4 has good opacity but lower L*, while the control sample has lower opacity but good L*. This points out the need for opacifying layers not only to minimize the transmission properties, but the location and type of opacifying layer are critical to achieving good overall reflection characteristics. Samples 1 and 4 both use a metallic layer for opacity of the imaging base, but by using both voids and pigment opacifying layer under a voided support as in Sample 1, there is a significantly reduction in the show through. This is noted in the L* numbers of sample 1 of 94.2 vs. sample 4 which has an L* of 86. It should be noted that sample 4 does not have an opacifying layer below the polyester base sheet.

L* or lightness and opacity was measured for using a Spectrogard spectrophotometer, CIE system, using illuminant D6500. L* or lightness is a measurement of the brightness of the support material. A L* of zero is a perfect black material, a L* of 100 is a perfect white reflector. For a photographic element, spectral transmission is the ratio of the transmitted power to the incident power and is expressed as a percentage as follows; $T_{RGB}=10^{-D}*100$ where D is the average of the red, green, and blue Status A transmission density response measured by an X-Rite model 310 (or comparable) photographic transmission densitometer.

The invention has been described in detail with particular reference to certain preferred embodiments thereof, but it will be understood that variations and modifications can be effected within the spirit and scope of the invention.

What is claimed is:

1. A photographic element comprising a laminated base wherein said base comprises a voided polyester sheet containing at least one voided layer having laminated thereto a biaxially oriented polyolefin sheet laminated to the bottom of said polyester sheet and a biaxially oriented polyolefin sheet laminated to the top of said polyester sheet, wherein said photographic element has a bottom opacifying layer below at least one voided layer of said voided polyester sheet and wherein said bottom opacifying layer below at least one layer of said voided polyester sheet comprises a voided layer and wherein said photographic element has a top side voided opacifying layer above said at least one voided layer of said voided polyester sheet.

2. The photographic element of claim 1 wherein said bottom side opacifying layer is an integral bottom layer of said voided polyester sheet.

3. The photographic element of claim 1 further comprising a polyolefin layer between said bottom opacifying layer and a binder for the bottom biaxially oriented polyolefin sheet.

4. The photographic element of claim 1 wherein said voided polyester sheet comprises a biaxially oriented polymer sheet.

5. The photographic element of claim 1 further comprising a photographic layer wherein said layer directly adjacent to the photographic layer comprises polyethylene.

6. The photographic element of claim 1 wherein said opacifying layer below at least one voided layer of said voided polyester sheet has a special transmission of less than 10%.

7. The photographic element of claim 1 wherein said opacifying layer below at least one voided layer of said voided polyester sheet is coated onto said voided polyester sheet prior to lamination to form said laminated base.

8. The photographic element of claim 1 wherein said opacifying layer below at least one voided layer of said voided polyester sheet further comprises a dye or pigment in apolymer layer.

9. The photographic element of claim 1 wherein said opacifying layer below at least one voided layer of said voided polyester sheet further comprises a metallized layer applied to said voided polyester sheet.

10. The photographic element of claim 1 wherein said opacifying layer below at least one voided layer of said voided polyester sheet further comprises a $TiO_2$ pigment in a polymer layer wherein said $TiO_2$ comprises between 30 and 70% by weight of said opacifying layer.

11. The photographic element of claim 1 wherein said opacifying layer below at least one voided layer of said voided polyester sheet further comprises a carbon black in a polymer.

* * * * *